(12) United States Patent
Kim et al.

(10) Patent No.: US 10,038,934 B2
(45) Date of Patent: Jul. 31, 2018

(54) METHOD AND DEVICE FOR PLAYING CONTENT

(71) Applicant: LG ELECTRONICS INC., Seoul (KR)

(72) Inventors: Soyoung Kim, Seoul (KR); Youngjun Jo, Seoul (KR); Youngwook Kang, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/118,019

(22) PCT Filed: Oct. 24, 2014

(86) PCT No.: PCT/KR2014/010074
§ 371 (c)(1),
(2) Date: Aug. 10, 2016

(87) PCT Pub. No.: WO2015/119357
PCT Pub. Date: Aug. 13, 2015

(65) Prior Publication Data
US 2017/0013307 A1    Jan. 12, 2017

Related U.S. Application Data

(60) Provisional application No. 61/938,091, filed on Feb. 10, 2014, provisional application No. 61/938,085, (Continued)

(51) Int. Cl.
*H04N 7/173* (2011.01)
*H04N 21/432* (2011.01)
(Continued)

(52) U.S. Cl.
CPC ..... *H04N 21/4325* (2013.01); *H04N 21/2541* (2013.01); *H04N 21/43615* (2013.01);
(Continued)

(58) Field of Classification Search
CPC combination set(s) only.
See application file for complete search history.

(56) References Cited

U.S. PATENT DOCUMENTS

2004/0261093 A1* 12/2004 Rebaud .................. G06F 21/10
725/25
2008/0289050 A1* 11/2008 Kawamoto ............. G06F 21/10
726/28

(Continued)

FOREIGN PATENT DOCUMENTS

KR    10-2005-0023683 A    3/2005
KR    10-2009-0022613 A    3/2009
(Continued)

*Primary Examiner* — Mulugeta Mengesha
(74) *Attorney, Agent, or Firm* — Birch, Stewart, Kolasch & Birch, LLP

(57) ABSTRACT

Disclosed is a method for playing content stored in a storage device connected through at least one interface, including detecting a first storage device and a second storage device connected a second playback device, requesting first information related to the detected second storage device, receiving the first information from the second playback device, and playing at least one content included in the first storage device or the second storage device, wherein the first information includes at least any one of an identifier (ID) of the second playback device, an ID of the second storage device, and a content ID list.

14 Claims, 26 Drawing Sheets

Related U.S. Application Data filed on Feb. 10, 2014, provisional application No. 61/947,351, filed on Mar. 3, 2014.

(51) Int. Cl.
  *H04N 21/441* (2011.01)
  *H04N 21/436* (2011.01)
  *H04N 21/254* (2011.01)
  *H04N 21/442* (2011.01)
  *H04N 21/462* (2011.01)
  *H04N 21/4627* (2011.01)

(52) U.S. Cl.
  CPC ..... *H04N 21/441* (2013.01); *H04N 21/44227* (2013.01); *H04N 21/4622* (2013.01); *H04N 21/4627* (2013.01)

(56) References Cited

U.S. PATENT DOCUMENTS

| | | | |
|---|---|---|---|
| 2008/0294894 A1* | 11/2008 | Dubhashi | H04L 9/3271 713/168 |
| 2011/0055878 A1 | 3/2011 | Mizuno et al. | |
| 2011/0072491 A1* | 3/2011 | Lou | G06F 21/31 726/2 |

FOREIGN PATENT DOCUMENTS

| KR | 10-2011-0111752 A | 10/2011 |
|---|---|---|
| WO | WO 2012/131400 A1 | 10/2012 |

\* cited by examiner

【Fig. 1】
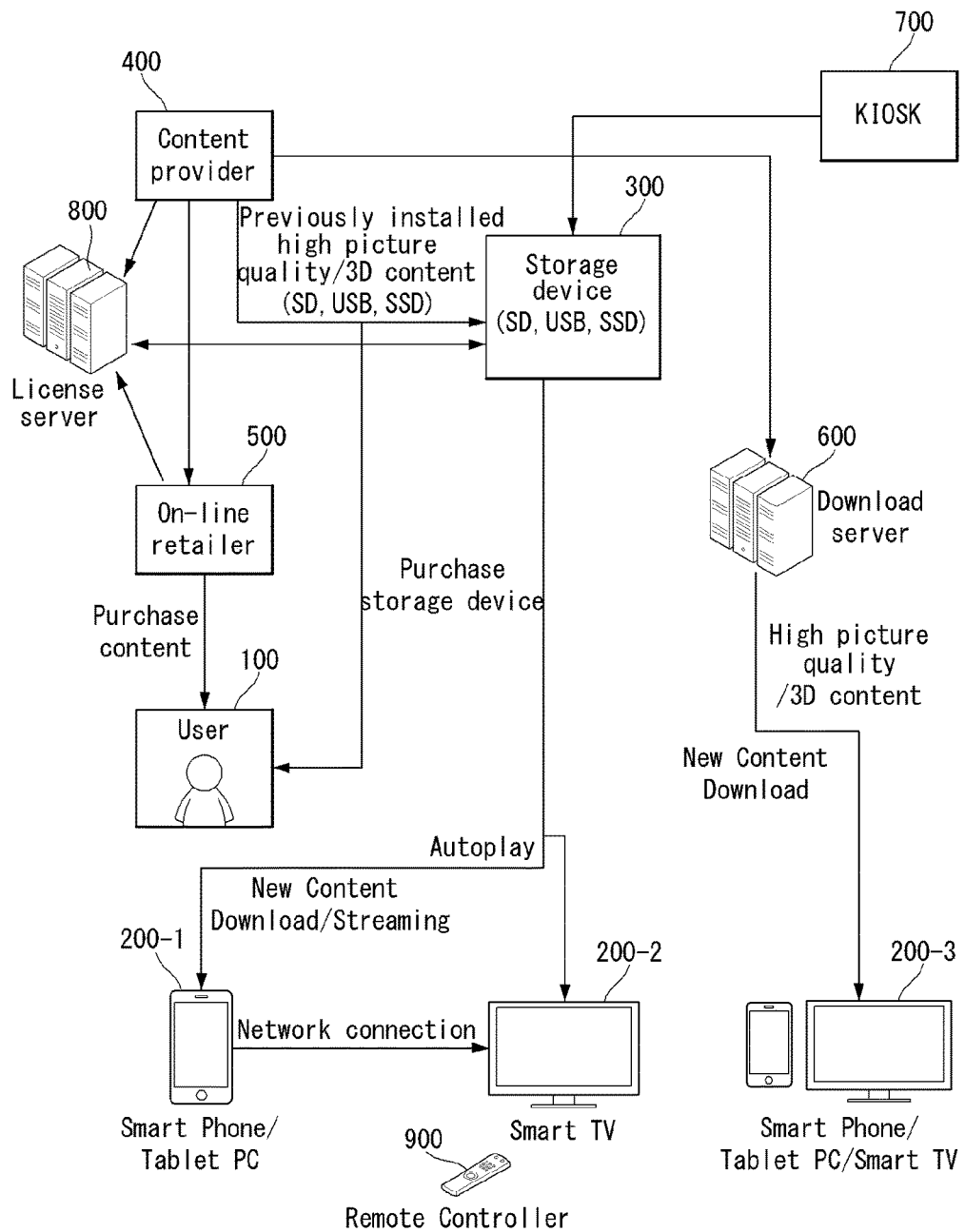

[Fig. 2]
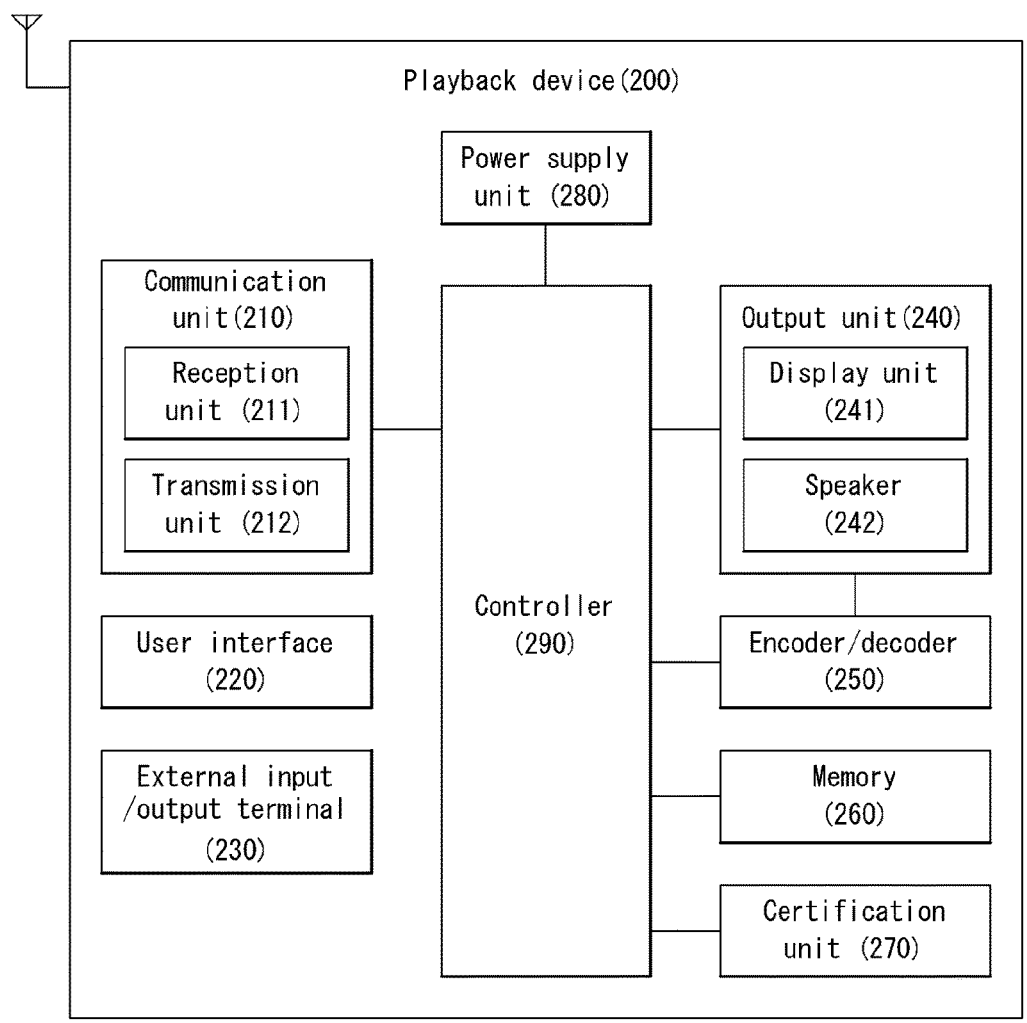

【Fig. 3】
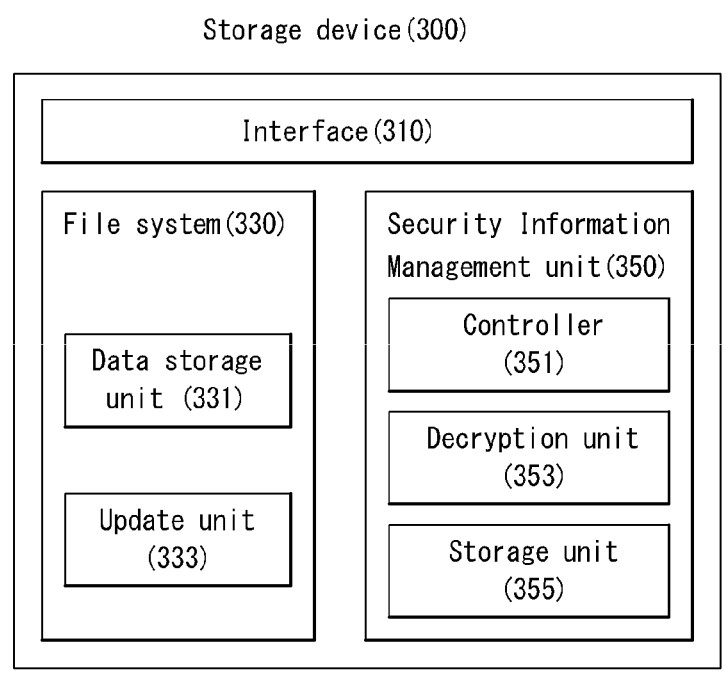

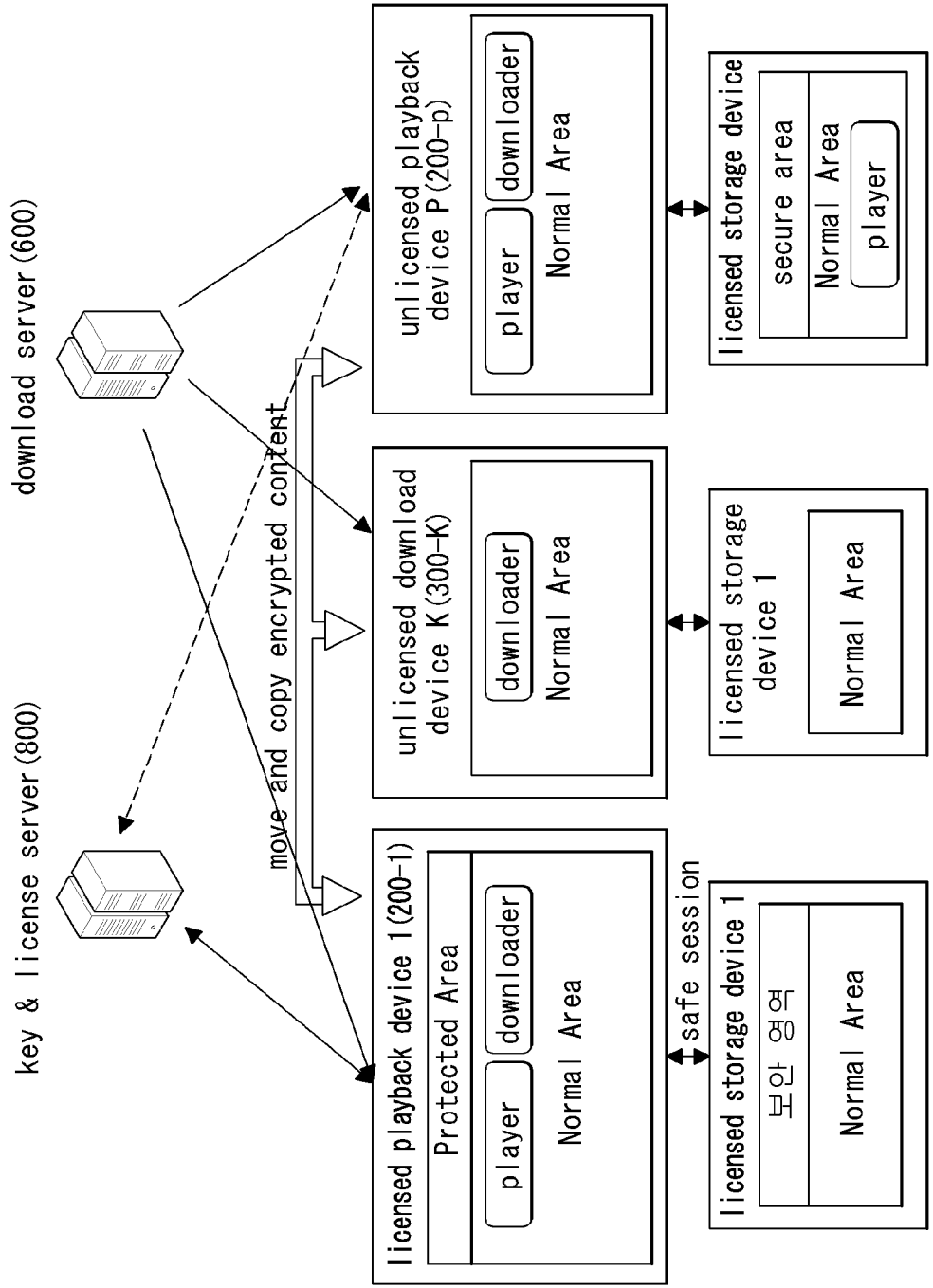
[Fig. 4]

[Fig. 5]
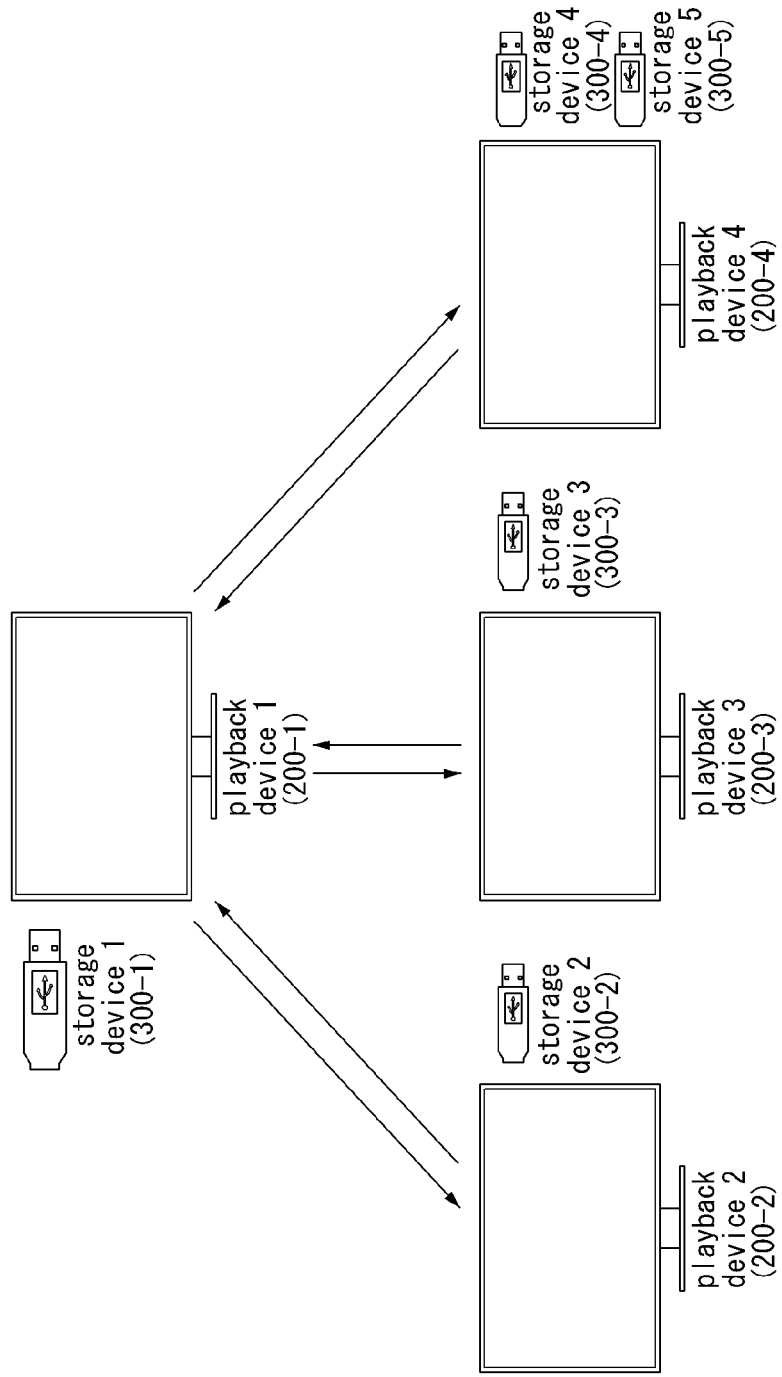

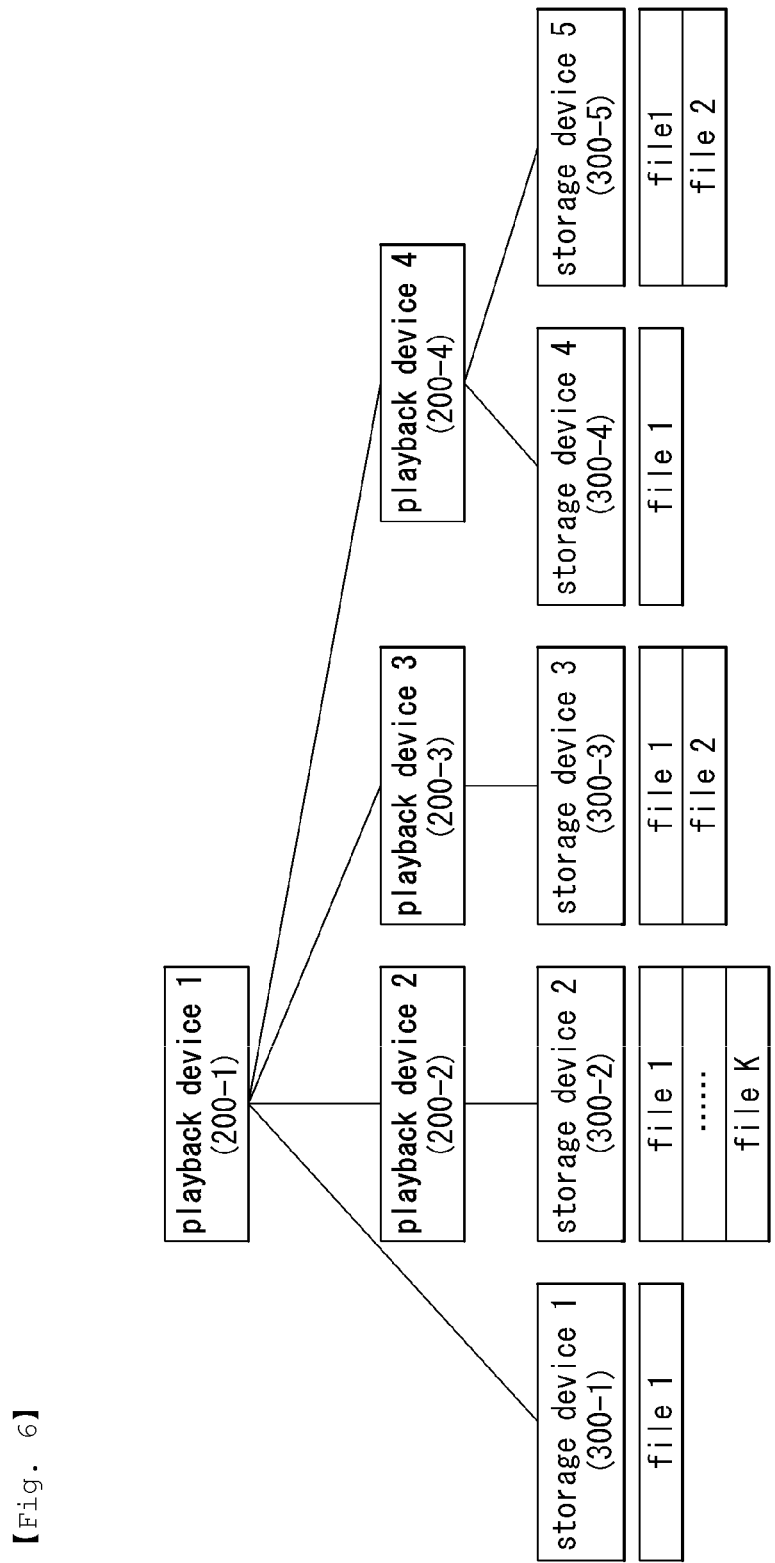
[Fig. 6]

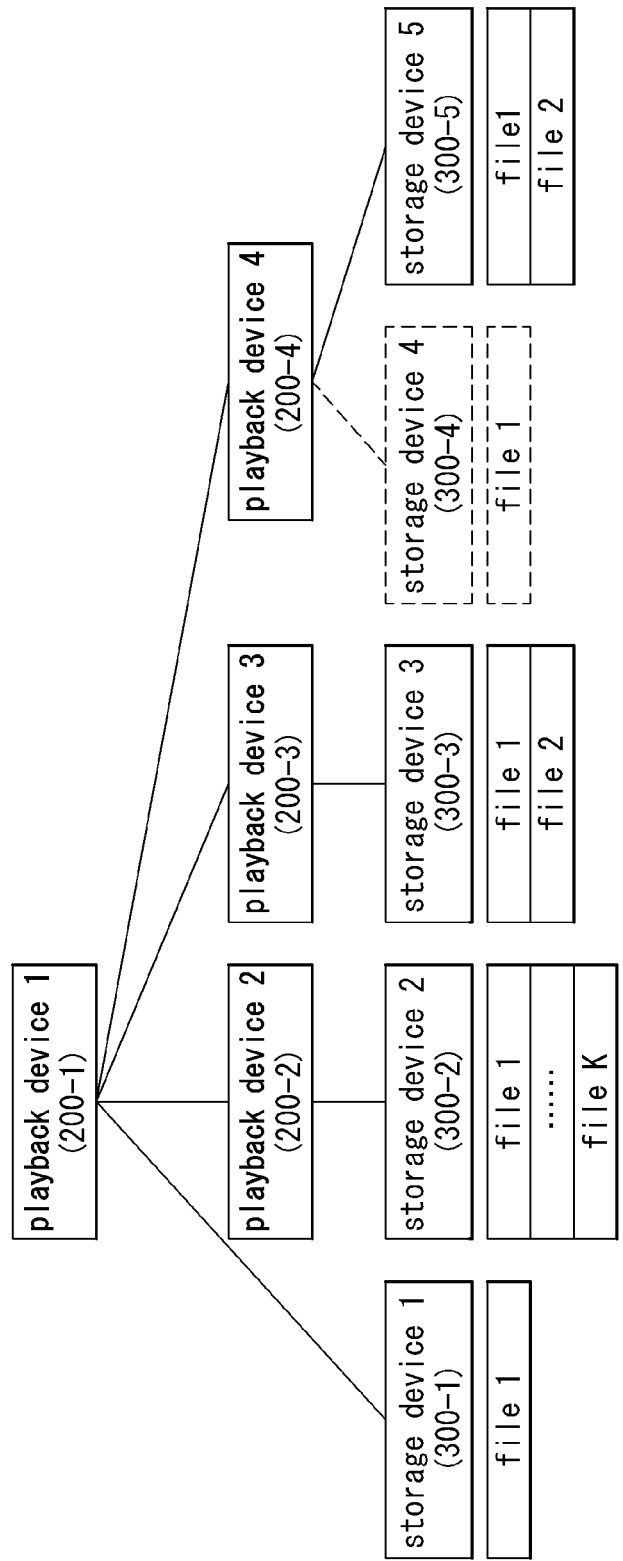
[Fig. 7]

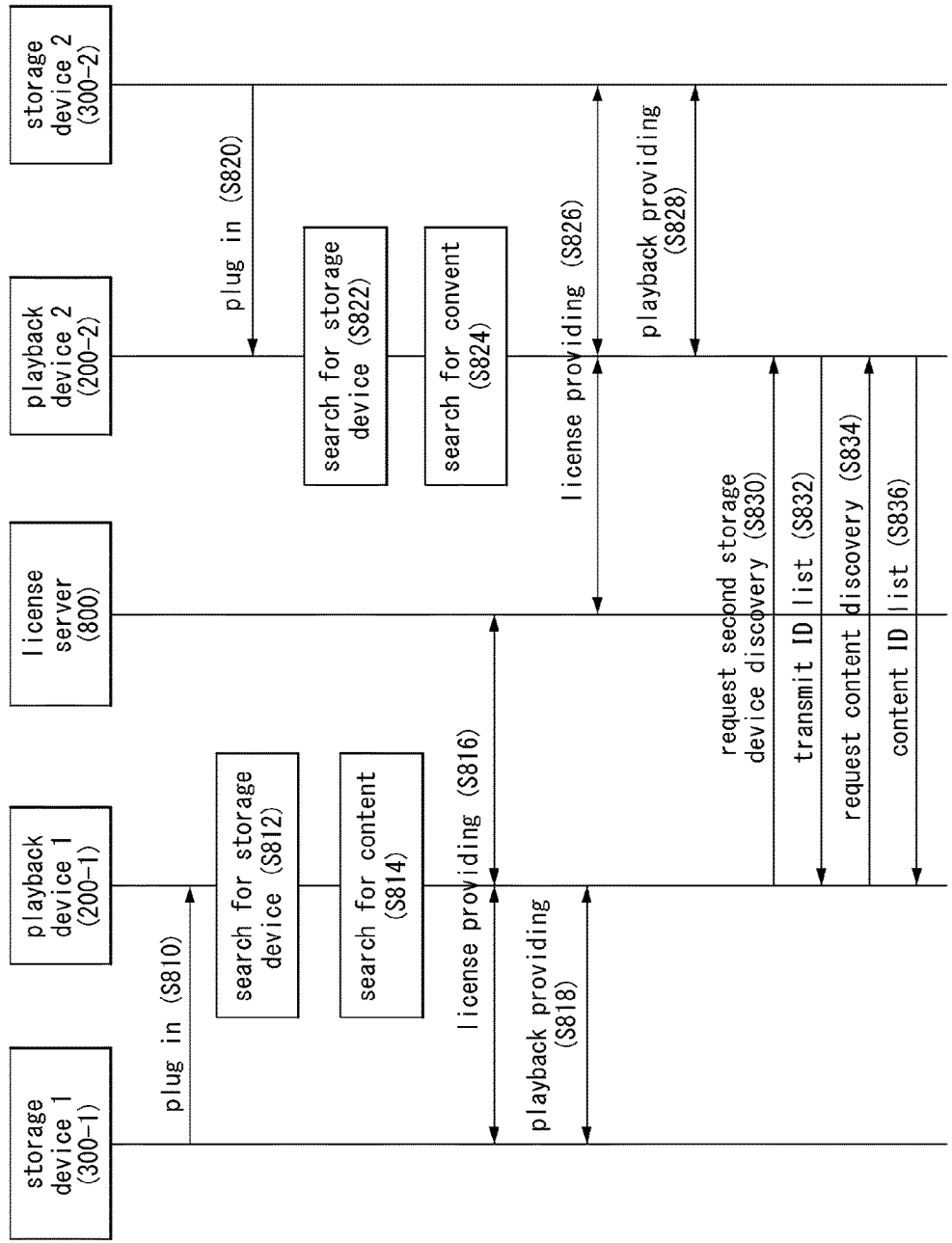
[Fig. 8]

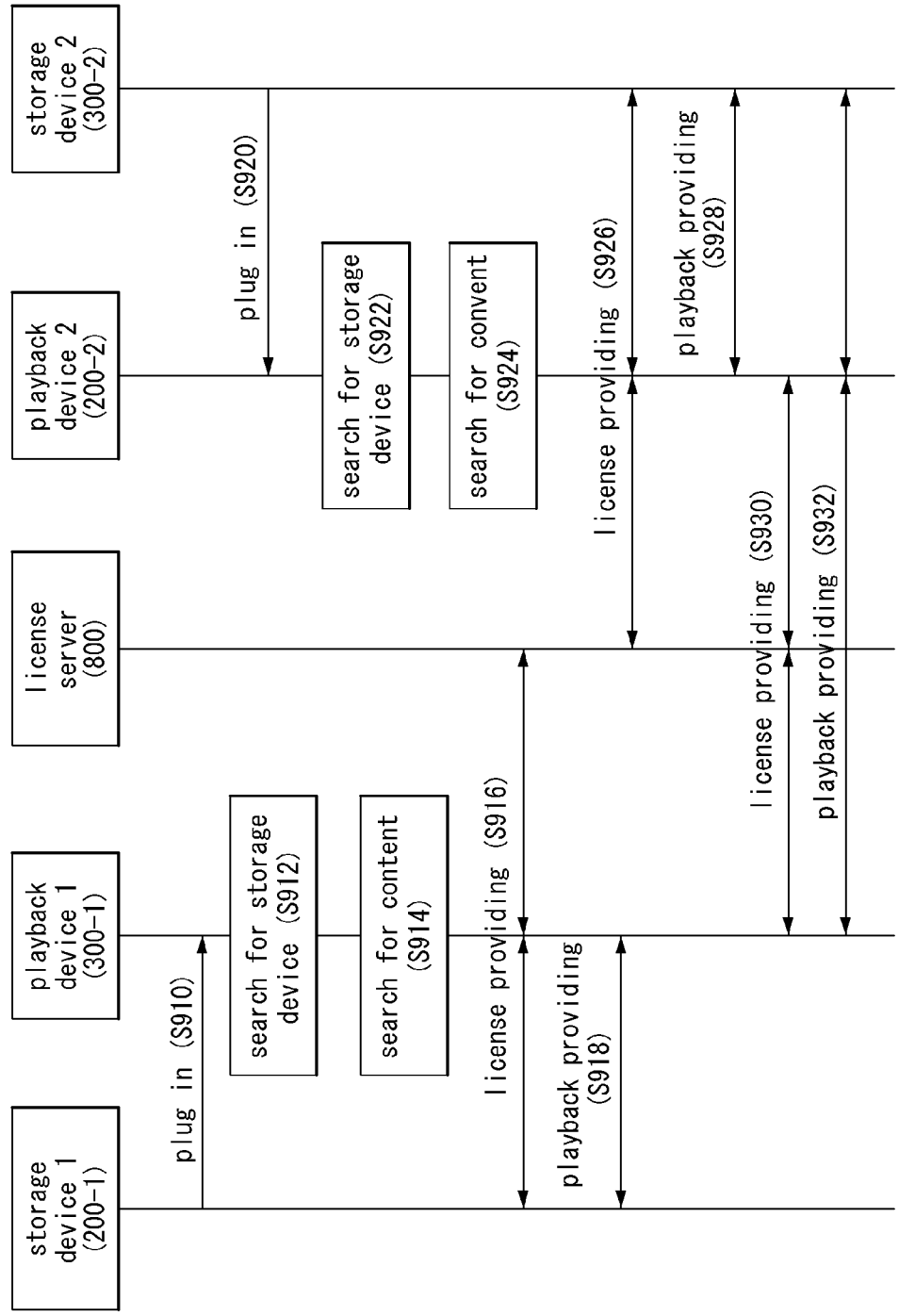
[Fig. 9]

【Fig. 10A】
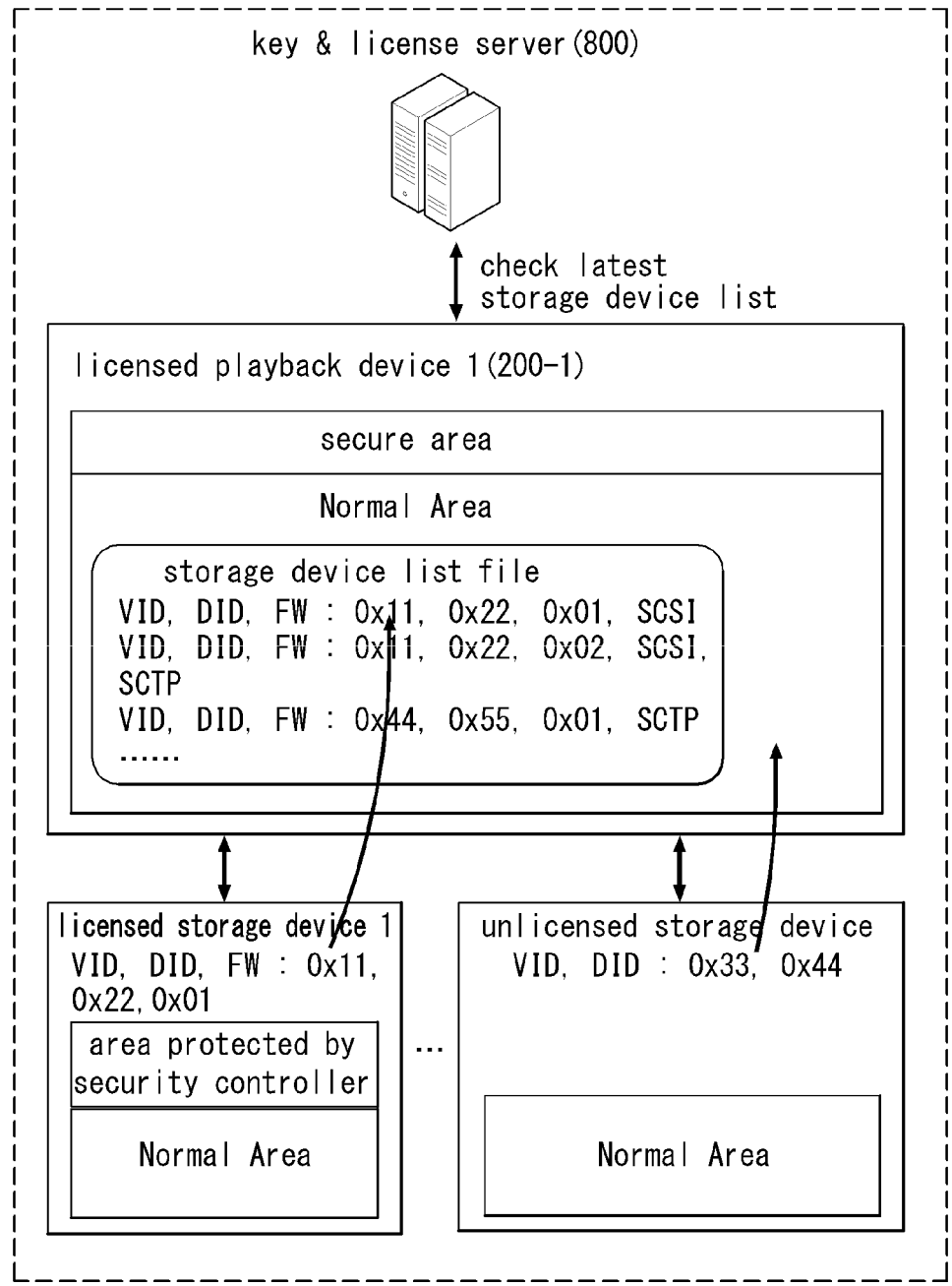

[Fig. 10B]
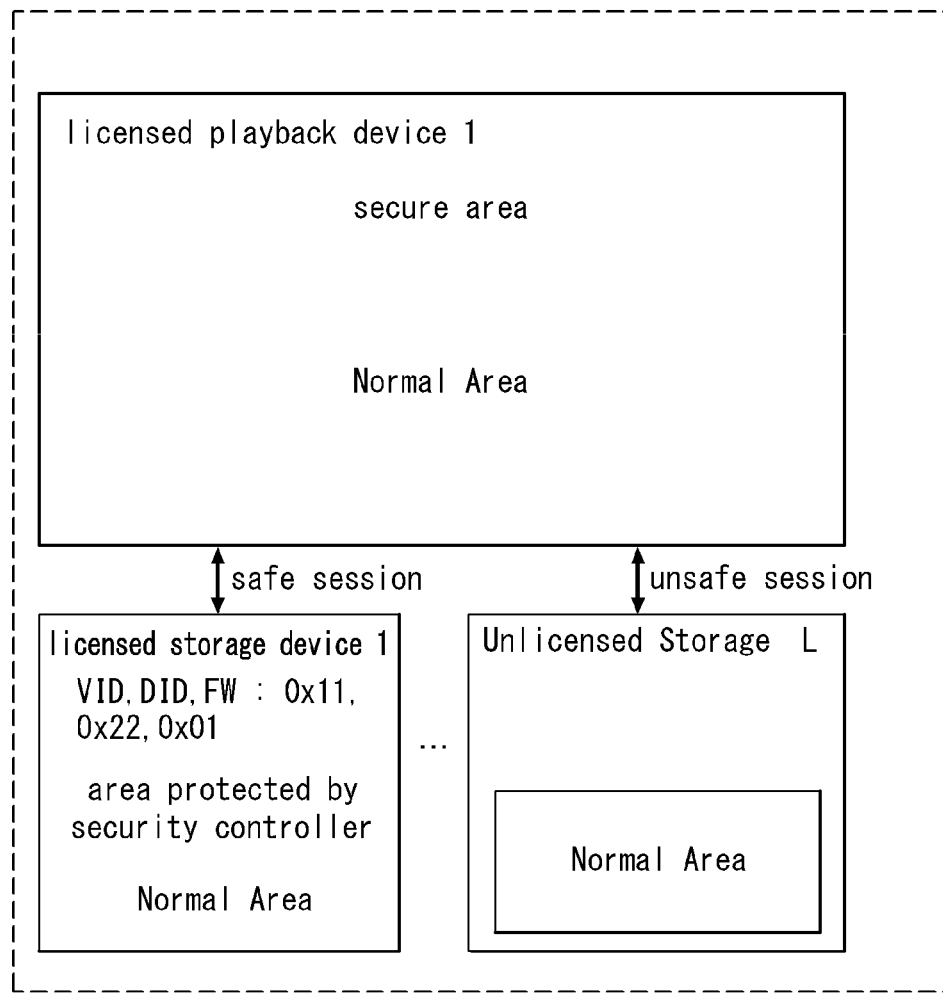

[Fig. 11]
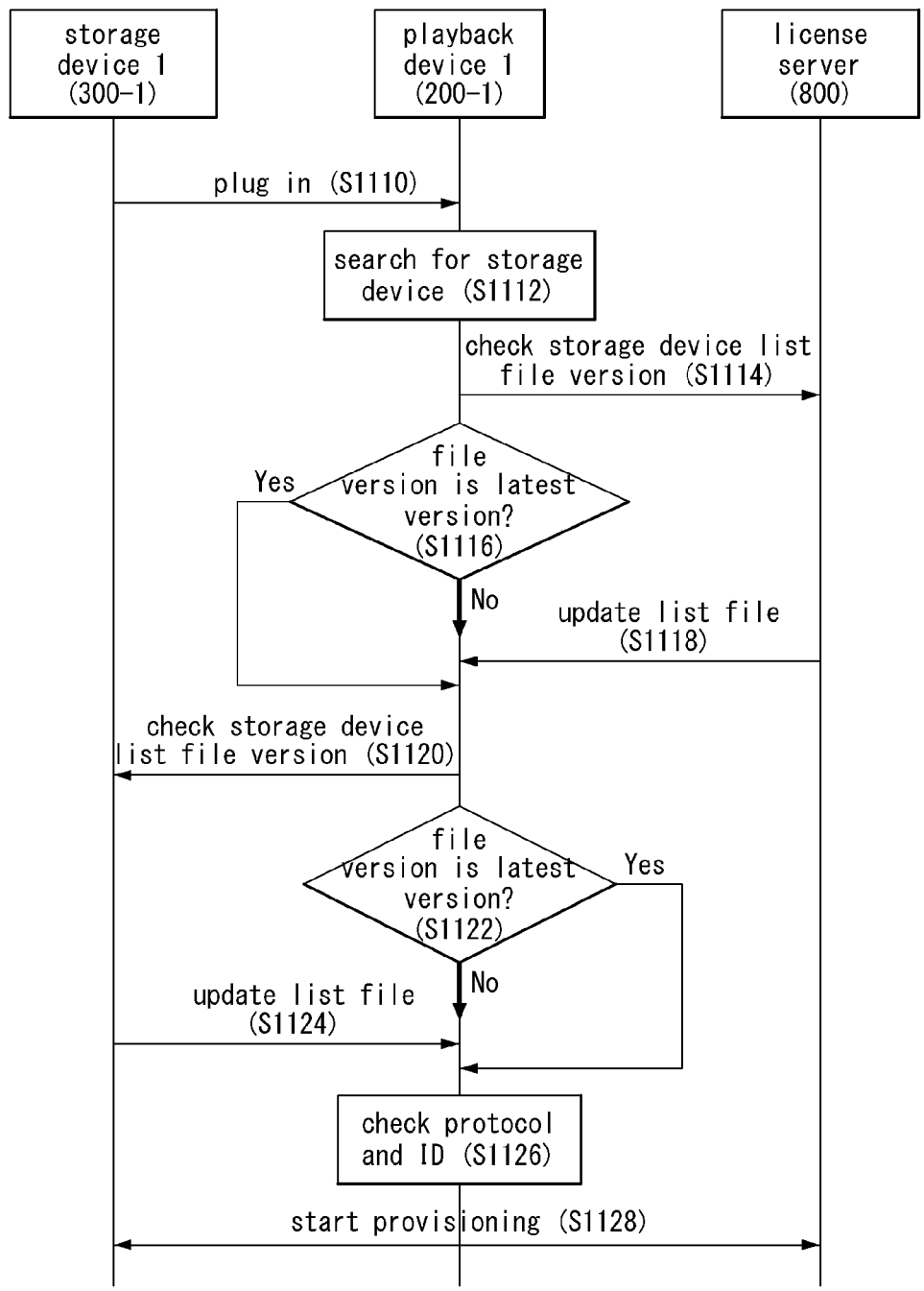

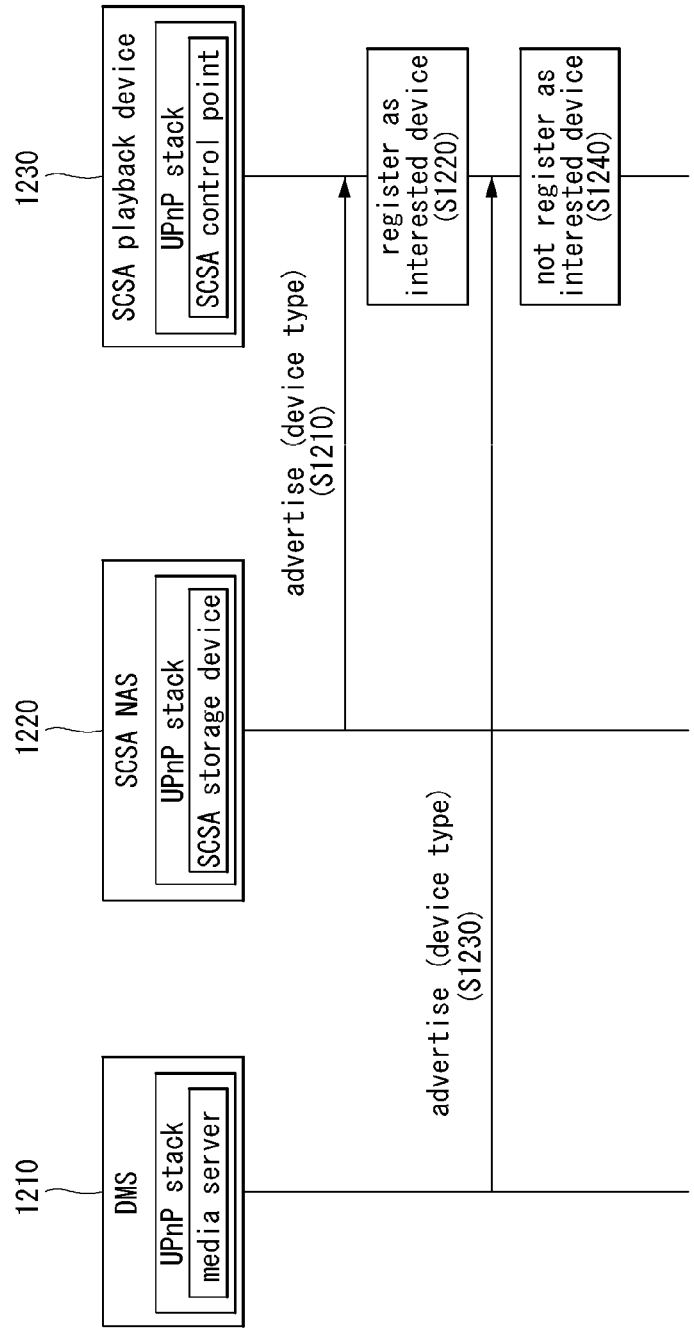
[Fig. 12]

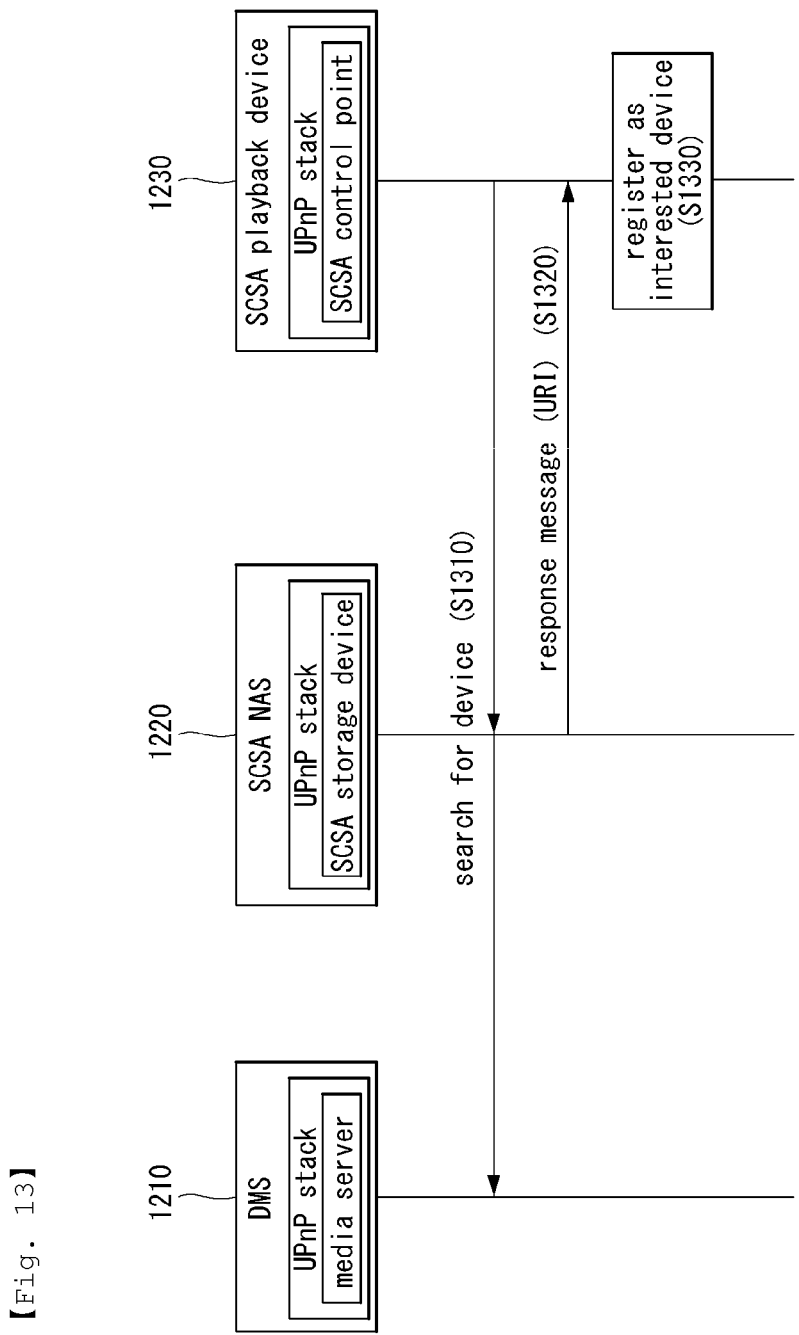
[Fig. 13]

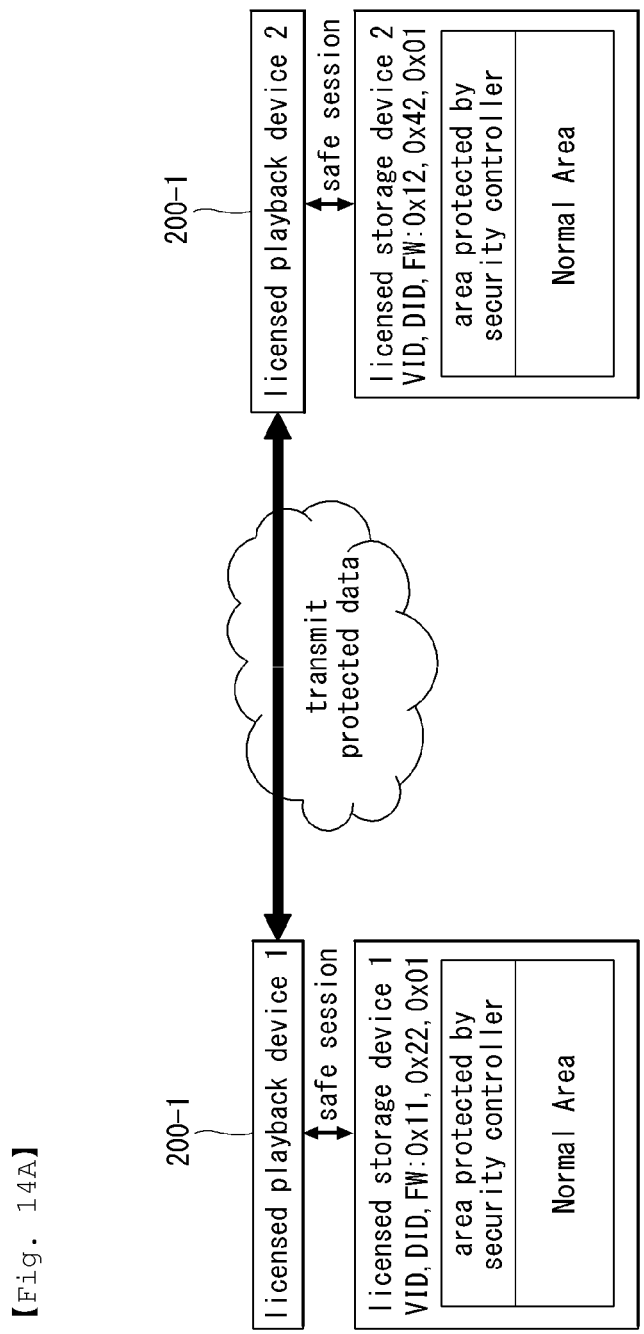

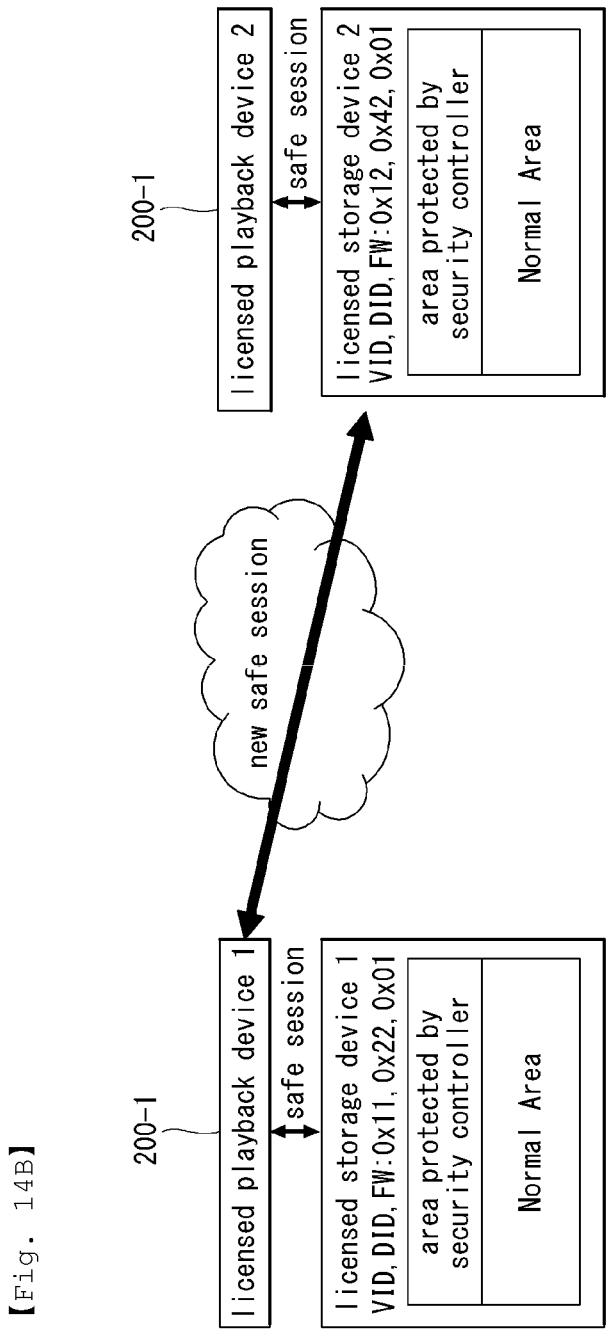
[Fig. 14B]

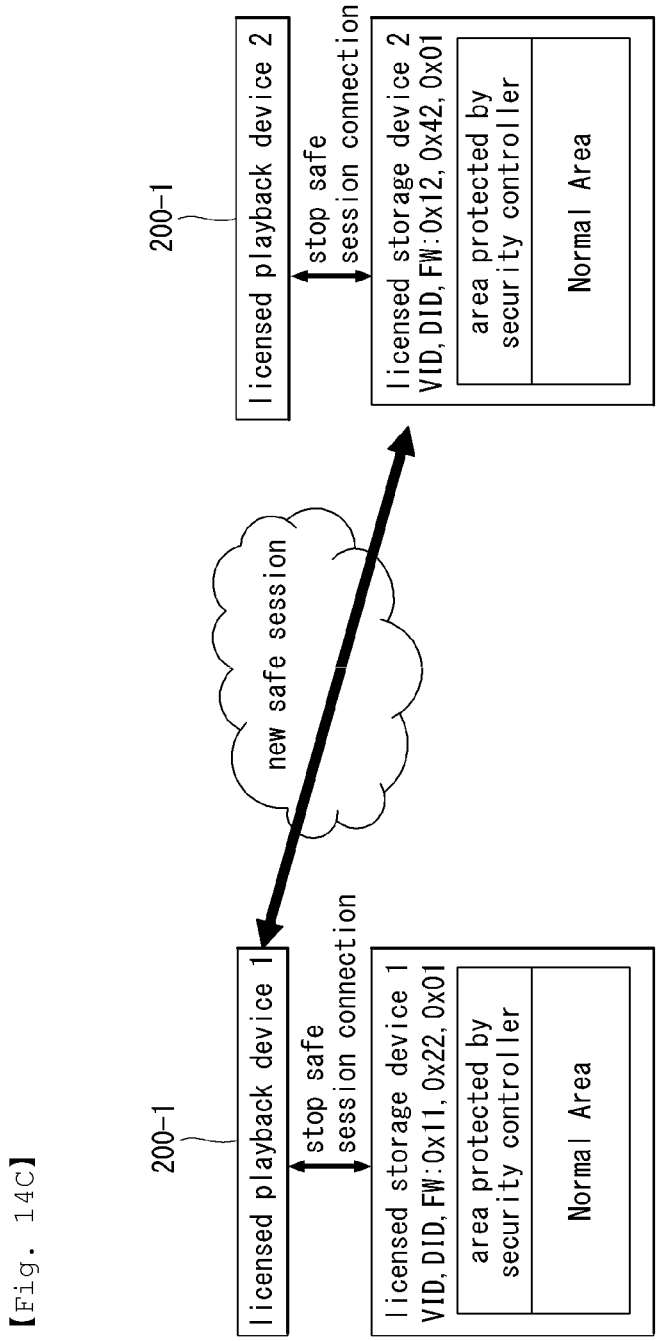
[Fig. 14C]

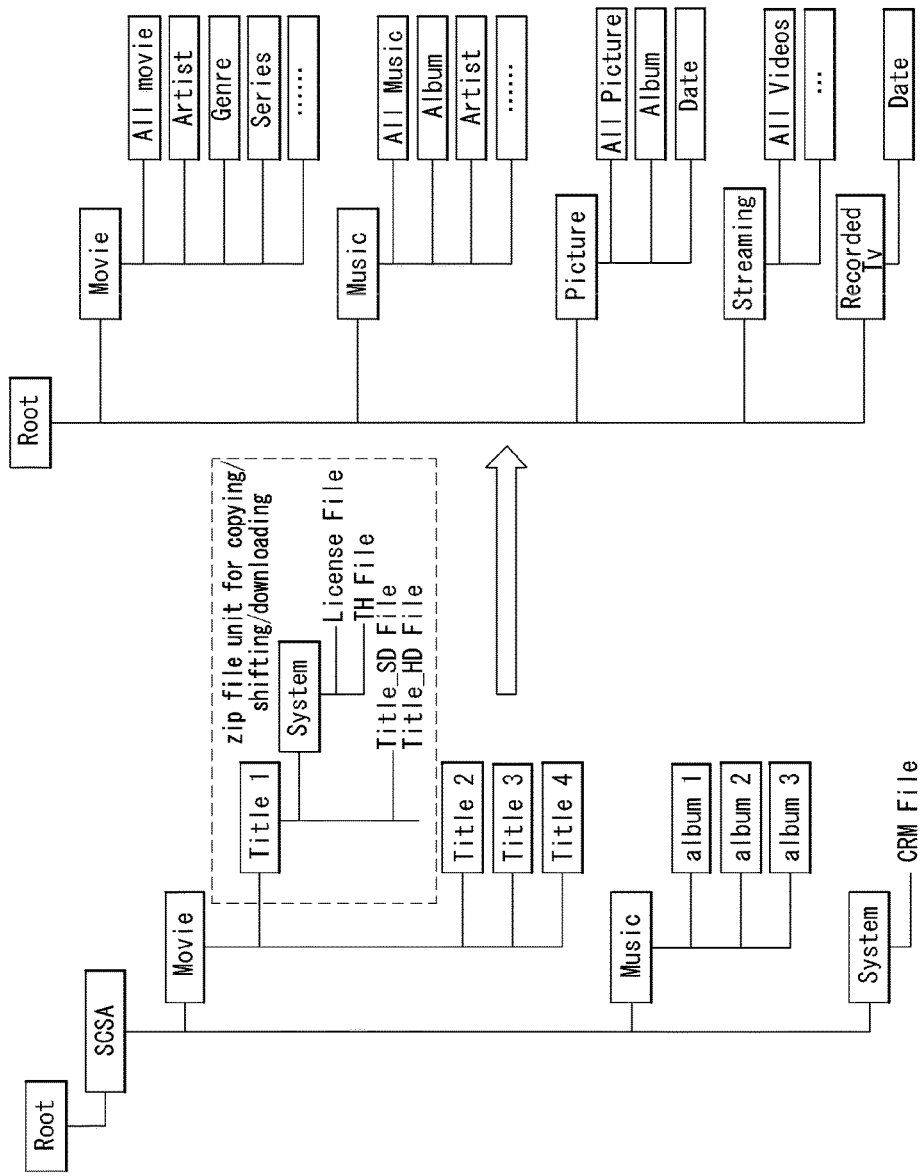
[Fig. 15]

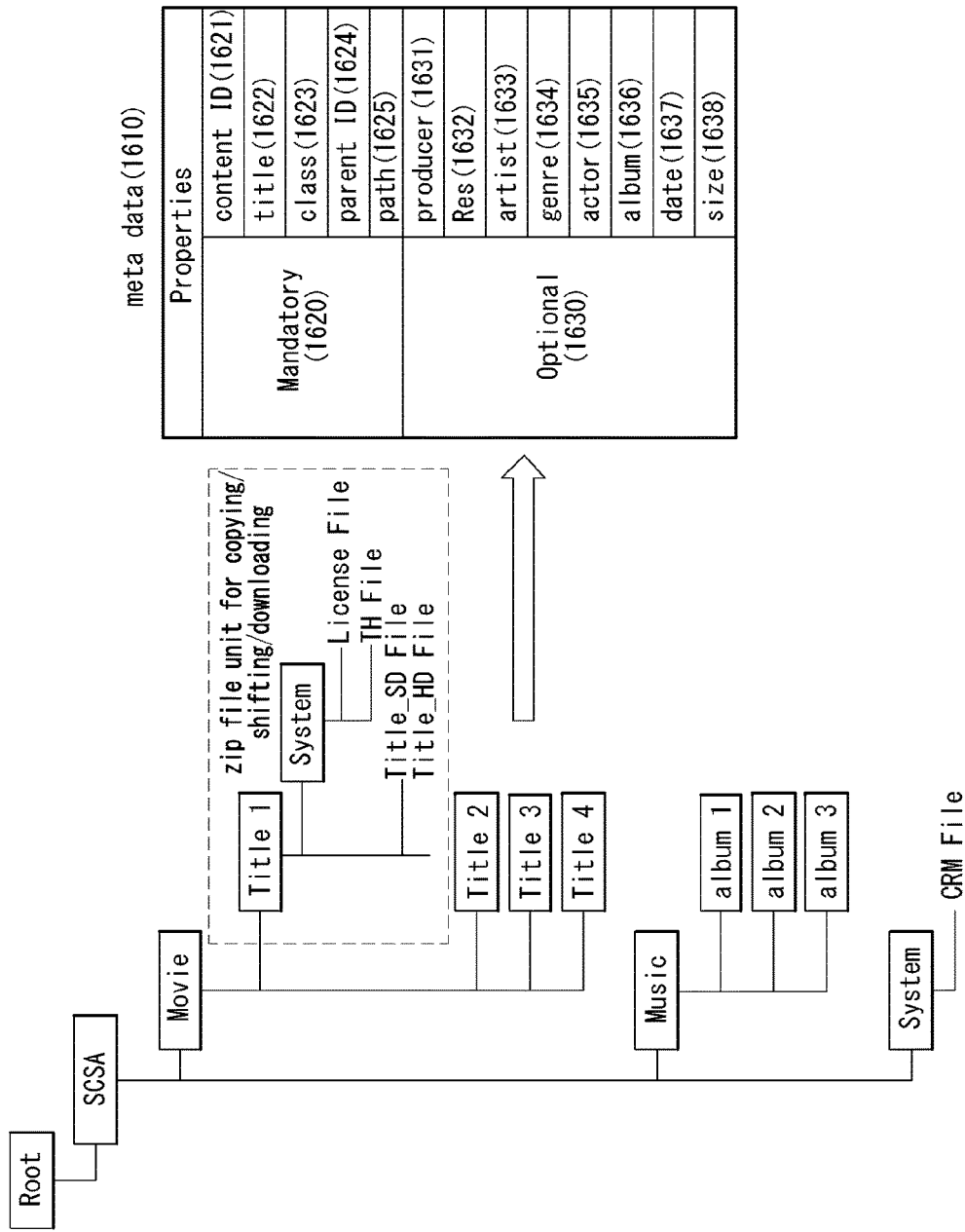
[Fig. 16]

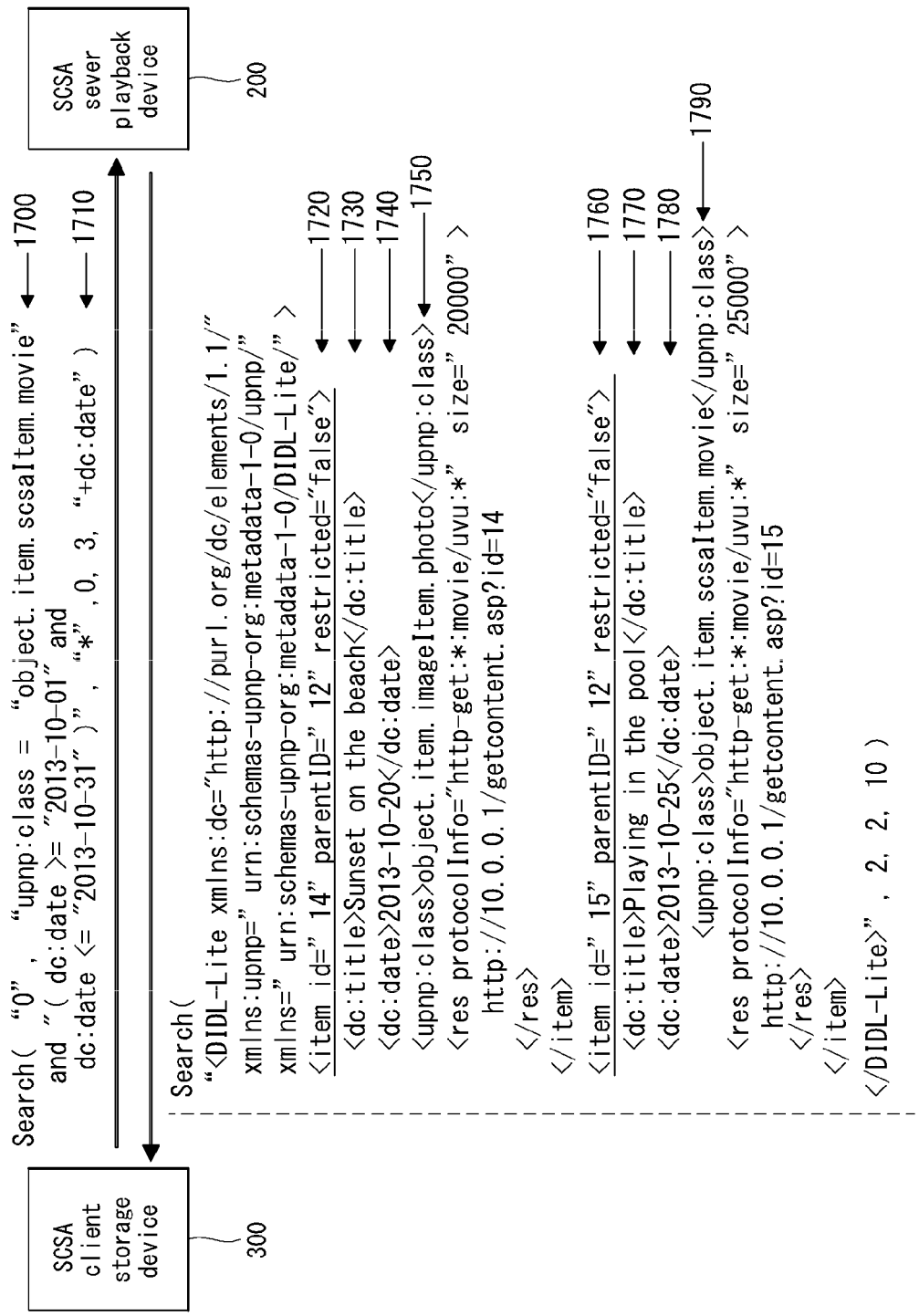
[Fig. 17]

[Fig. 18]
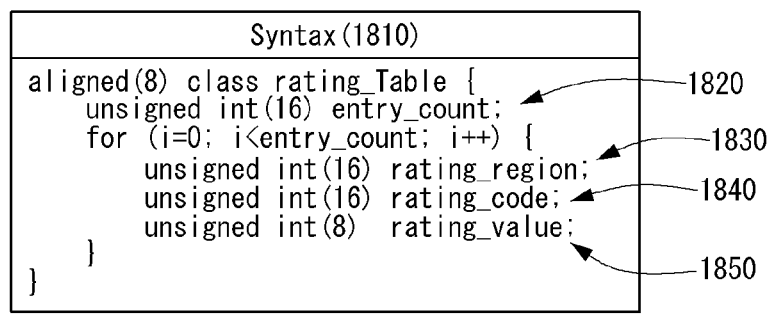

【Fig. 19】
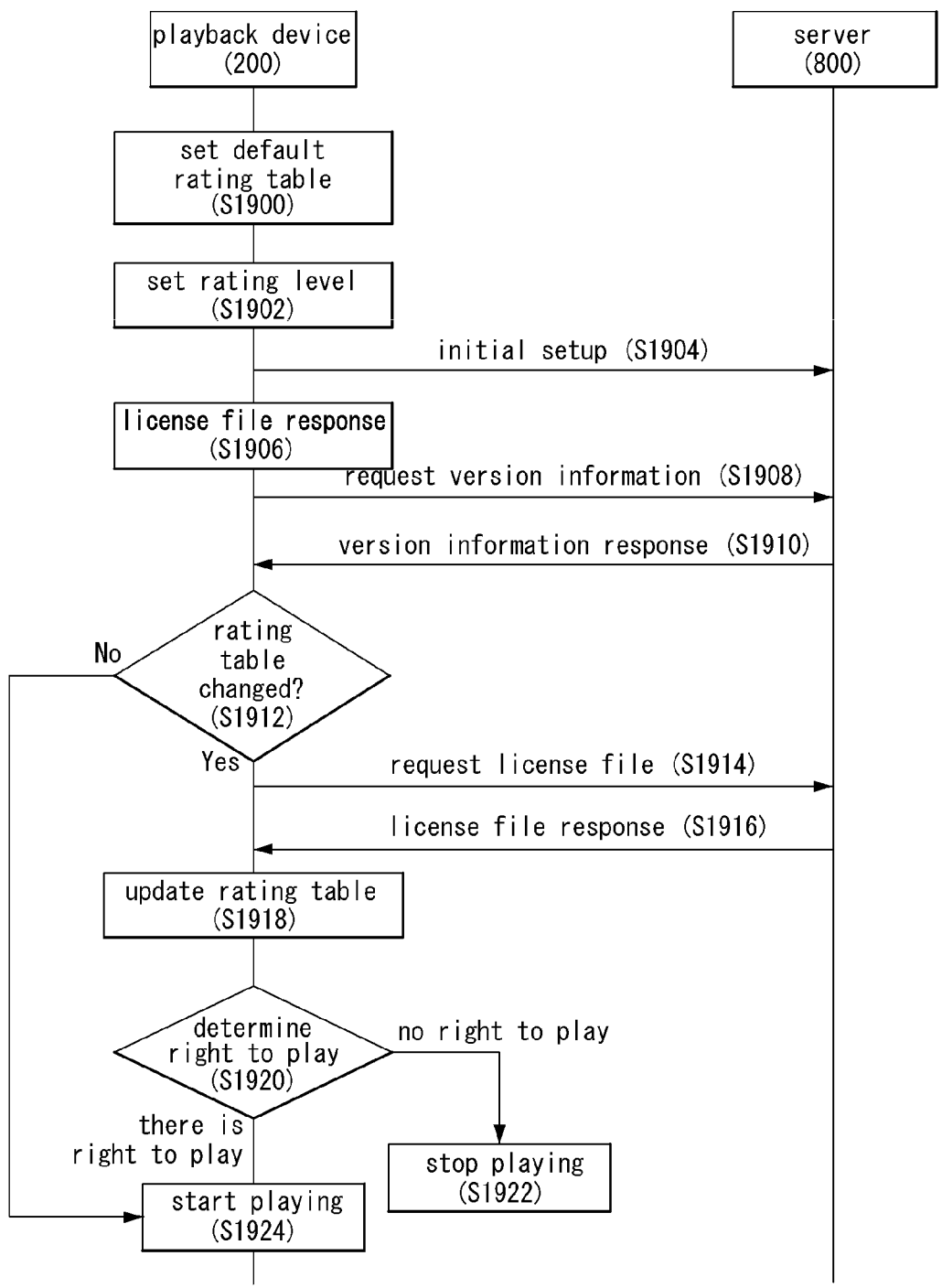

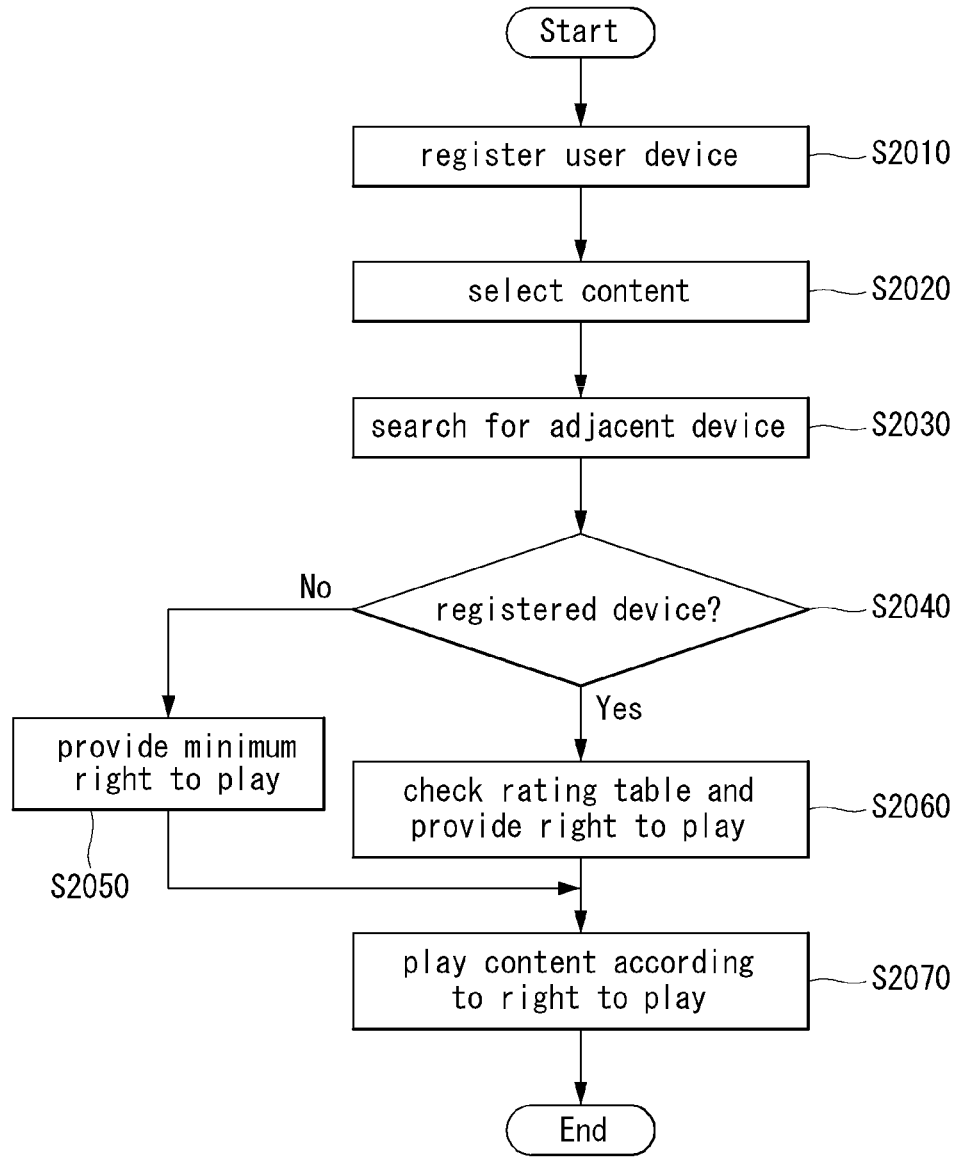

【Fig. 21】
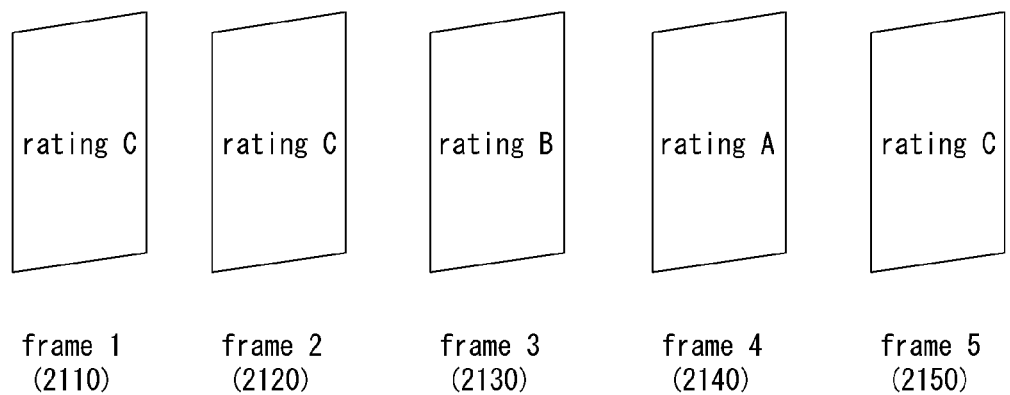

[Fig. 22]
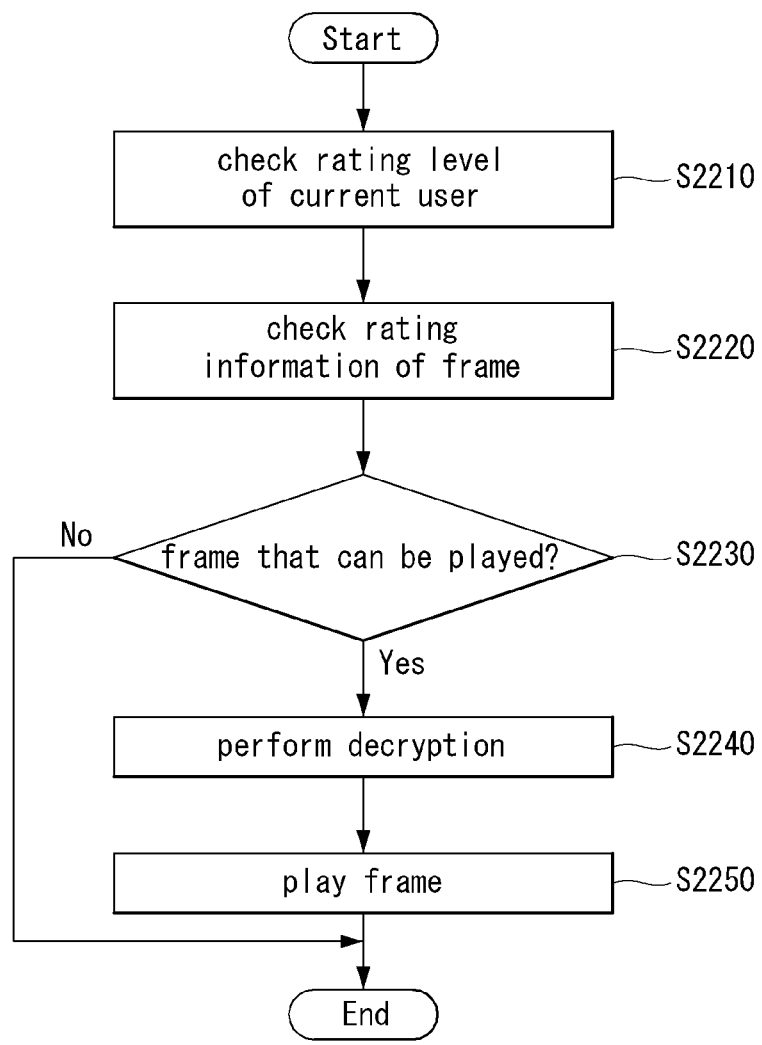

【Fig. 23】

CFF container format(2310)

```
aligned(8) class TrickPlayBox
extends FullBox( 'trik' , version=0, flags=0)
{
    if(flags == 0) {
        for (i=0; i < sample_count; i++) {
            unsigned int(2) pic_type;
            unsigned int(6) dependency_level;
        }
    }
    if(flags == 1) {
        for (i=0; i < sample_count; i++) {
            unsigned int(2) pic_type;
            unsigned int(6) dependency_level;
            unsigned int(8) rating_info;    ← 2320
        }
    }
}
```

METHOD AND DEVICE FOR PLAYING CONTENT

CROSS REFERENCE TO RELATED APPLICATIONS

This application is the National Phase of PCT International Application No. PCT/KR2014/010074, filed on Oct. 24, 2014, which claims priority under 35 U.S.C. 119(e) to U.S. Provisional Application No. 61/938,091, filed on Feb. 10, 2014, U.S. Provisional Application No. 61/938,085, filed on Feb. 10, 2014, and U.S. Provisional Application No. 61/947,351, filed on Mar. 3, 2014, all of which are hereby expressly incorporated by reference into the present application.

TECHNICAL FIELD

The present invention relates to a method and device for playing content. More particularly, the present invention relates to a method and device for flexibly changing a playback right content when a playback device searches for content present in various storage devices or plays content in a network.

BACKGROUND ART

Recently, as smartphones and smart TVs have adopted ultra-high definition (UHD) technology beyond full HD, various types of full HD or UHD content are anticipated to be encountered in several fields such as movie, concerts, and sports, as well as air channel broadcasting in the future.

However, if existing playback devices are not able to play various types of full HD and UHD content, users cannot use such content. Thus, playback devices are required to play full HD and UHD content, and a scheme enabling even an existing playback device to play such content may be required.

In order to play HD content, users may need to have a right to do it, and in order to more effectively manage HD content, a method for managing HD content may be required. In addition, a method for searching for various types of content and playing content in a network may be required.

DISCLOSURE

Technical Problem

Therefore, an object of the present invention is to define a system architecture including a configuration of a device capable of searching for and playing content stored in a storage device, a network configuration, a transmission protocol between a server and a device, and the like.

Another object of the present invention is to provide a method for searching for content from a storage device connected to a playback device.

Another object of the present invention is to provide a method for searching for a plurality of contents connected to a plurality of playback devices.

Another object of the present invention is to provide a method for flexibly changing a user's rights to play content.

Another object of the present invention is to provide a method for setting a separate playback right by frames of content.

Another object of the present invention is to provide a method for creating meta data for playback in a playback device.

Technical Solution

According to an aspect of the present invention, there is provided a method for playing content, including: detecting a first storage device and a second storage device connected a second playback device; requesting first information related to the detected second storage device; receiving the first information from the second playback device; and playing at least one content included in the first storage device or the second storage device, wherein the first information may include at least any one of an identifier (ID) of the second playback device, an ID of the second storage device, and a content ID list.

The method may further include: requesting storage device list version information from a license server; receiving the storage device list version information from the license server; and updating a storage device list on the basis of the received storage device list version information, wherein the storage device list may be a list of storage devices connected to a playback device connected to the first playback device.

The method may further include: receiving meta data regarding content included in the second storage device from the second playback device.

The playing of content may include: transmitting transaction information stored in the first storage device or the second storage device to the license server, the transaction information including transaction identification information identifying a corresponding transaction and a user; receiving license information permitting playing of the content from the license server; and playing the content on the basis of the license information, wherein the license information includes a license file and a license key.

The second storage device may include a lock function, and when the lock function is set in the second storage device, the second storage device may not be detected.

In the playing of content, whether to play the content may be determined on the basis of level information of the first playback device, and the level information of the first playback device may be determined by an adjacent user device.

When a registered user device is present nearby, the level information of the first playback device may be determined on the basis of information of the registered user device, and when the registered user device is not present nearby, the level information of the first playback device may be set to lowest level information.

When the level information of the first playback device is not lower than level information of the content, the content may be played.

The level information of the content may be set by frames of the content, and when the level information of the first playback device is not lower than level information of a frame of the content, the frame of the content may be played.

According to another aspect of the present invention, there is provided a device for playing content, including: a display unit configured to output played content; a communication unit configured to transmit and receive a signal to and from the exterior wiredly and/or wirelessly; and a controller functionally connected to the communication unit, wherein the controller detects a first storage device and a second storage device connected to a second playback device, requests first information related to the detected second storage device from the second playback device, receives the first information from the second playback device, and plays at least one content included in the first storage device or the second storage device, wherein the first information includes at least any one of an identifier (ID) of the second playback device, an ID of the second storage device, and a content ID list.

The controller may request storage device list version information from a license server, receive the storage device list version information from the license server, and update a storage device list on the basis of the received storage device list version information, wherein the storage device list is a list of storage devices connected to a playback device connected to the first playback device.

The controller may receive meta data regarding content included in the second storage device from the second playback device.

The controller may transmit transaction information stored in the first storage device or the second storage device to the license server, the transaction information including information identifying a corresponding transaction and a user, receive license information permitting playing of the content from the license server, and play the content on the basis of the license information.

The second storage device may include a lock function, and when the lock function is set in the second storage device, the second storage device may not be detected.

The controller may determine whether to play the content on the basis of level information of the first playback device, and the level information of the first playback device may be determined by an adjacent user device.

When a registered user device is present nearby, the level information of the first playback device may be determined on the basis of information of the registered user device, and when the registered user device is not present nearby, the level information of the first playback device may be set to lowest level information.

When the level information of the first playback device is not lower than level information of the content, the controller may play the content.

The level information of the content may be set by frames of the content, and when the level information of the first playback device is not lower than level information of a frame of the content, the frame of the content may be played.

Advantageous Effects

According to embodiments of the present invention, the following advantages may be obtained.

Content of another playback device connected to one playback device may be searched.

Also, content included in a storage device of another playback device connected to one playback device may be searched.

Also, by providing a directory structure and a file format of high definition (HD) content, secure HD content data may be effectively managed and played.

Also, by flexibly changing the playback right content, content appropriate for a user may be provided without a separate operation.

Also, by setting the playback right for each frame of content, playback may be performed according to various users' rights by one content file.

DESCRIPTION OF DRAWINGS

FIG. 1 is a view illustrating a system for using secure high definition content service according to an embodiment to which the present invention is applied.

FIG. 2 is a schematic internal block diagram of a playback device for playing secure high definition content service according to an embodiment to which the present invention is applied.

FIG. 3 is a schematic internal block diagram of a storage device for storing secure high definition content service according to an embodiment to which the present invention is applied.

FIG. 4 is a view illustrating a network system structure of a storage device and a playback device according to license, to which the present invention is applied.

FIGS. 5 through 7 are views illustrating a system structure of a storage device and a playback device capable of storing and playing secure high definition content according to an embodiment to which the present invention is applied.

FIG. 8 is a flow chart illustrating a process of searching for content from a storage device connected to a playback device according to an embodiment to which the present invention is applied.

FIG. 9 is a flow chart illustrating a process of searching for and playing content from a storage device connected to a playback device according to an embodiment to which the present invention is applied.

FIGS. 10A and 10B are views illustrating a method for connecting a session between a storage device and a playback device based on a license according to an embodiment to which the present invention is applied.

FIG. 11 is a flow chart illustrating a process of updating a storage device list for content discovery according to an embodiment to which the present invention is applied.

FIGS. 12 and 13 are flow charts illustrating a process of searching for a storage device using short-range communication according to an embodiment to which the present invention is applied.

FIGS. 14A through 14C are views illustrating a session connection scheme based on a license according to an embodiment to which the present invention is applied.

FIGS. 15 and 16 are vies illustrating generation of meta data according to content according to an embodiment to which the present invention is applied.

FIG. 17 is a view illustrating a message configuration for content discovery according to an embodiment to which the present invention is applied.

FIG. 18 is a view illustrating a rating table for playing content according to an embodiment to which the present invention is applied.

FIG. 19 is a flow chart illustrating a process of playing content according to a rating level according to an embodiment to which the present invention is applied.

FIG. 20 is a flow chart illustrating a process for flexibly changing a rating level according to a user according to an embodiment to which the present invention is applied.

FIG. 21 is a view illustrating that a rating level is set to be different according to a frame of content according to an embodiment to which the present invention is applied.

FIG. 22 is a flow chart illustrating a process of setting a separate rating level according to a frame of content and playing content according to an embodiment to which the present invention is applied.

FIG. 23 is a view illustrating a message for applying a separate rating level according to a frame of content according to an embodiment to which the present invention is applied.

BEST MODES

Hereinafter, configurations and operations thereof in accordance with embodiments of the present invention are described with reference to the accompanying drawings. The configurations and operations of the present invention described with reference to the drawings are described as only embodiments, and the technical spirit and kernel configuration and operation of the present invention are not restricted by the configurations and operations.

Furthermore, common terms that are now widely used are selected as terms used in this specification, but in specific cases, terms randomly selected by the applicant are used. In this case, since the meaning of a corresponding term is clearly described in the detailed description of a corresponding part, the term should not be interpreted as being based on only the name of the term used in the description of this specification, but should be interpreted by checking even the meaning of the term.

FIG. 1 is an embodiment to which the present invention is applied and illustrates a system for using a secure high definition content service.

The system to which the present invention is applied may basically include a user 100 who purchases and uses secure high definition content, playback devices 200-1, 200-2, and 200-3 capable of playing the content, a storage device 300 in which the content has been stored or is capable of being stored, a content provider 400 which provides the content, a retailer 500 and/or an electronic kiosk 700 which is supplied with the content and provide the content to the user, a download server 600 which stores the content in order to download the content, and a license server 800 which provides license information that permits the playback of the content. Furthermore, the system may further include an external interface 900 for controlling the operation of the playback device, for example, a remote controller.

In an embodiment to which the present invention is applied, a user who tries to use a secure high definition content service may use the service using various methods. In this case, an example of secure high definition content may include secure content storage association (SCSA) content. Content described in this specification may include the SCSA content.

In a first example, the user 100 may use the service by purchasing the storage device in which the secure high definition content has already been stored. For example, the content provider 400 may preload content to be provided onto a hard disk drive (HDD), a portable hard drive, such as a solid state drive (SSD), or a flash memory product, such as a USB flash drive or an SD card, and may sell the content. The user 100 may use the service by purchasing the storage device in which required content has been stored.

In a second example, the user 100 may use the secure high definition content service by purchasing content from the retailer 500 who provides the secure high definition content service. For example, the retailer 500 may be provided with content from the content provider 400 and may provide a content service on online or on offline. The user 100 may use the service by legitimately purchasing content from the retailer 500. Furthermore, the user 100 may use the service by purchasing the storage device from the retailer 500.

In this case, the retailer 500 may provide the user 100 with transaction information corresponding to content purchase. In this case, the transaction information is indicative of information about content transaction activities, and may mean information about a set of right information. For example, the right information may be information indicating a status for issuing a license in the storage device. The transaction information may include transaction identification information identifying at least one of the corresponding transaction, a seller, and the user and right information indicating a right information item of the corresponding content. Here, the transaction identification information may provide a unique link regarding the corresponding transaction.

In a third example, the user 100 may play secure high definition content by inserting the storage device 300 in which the secure high definition content has been stored into the playback device 200-1. For example, the playback device may be all devices capable of playing multimedia content, such as a mobile device, TV, a computer, a notebook, and a tablet PC.

In a fourth example, the user 100 may insert the storage device 300 in which secure high definition content has been stored or may be stored into a first playback device 200-1 and may play the content in a second playback device 200-2. In this case, the first playback device 200-1 and the second playback device 200-2 may have been connected over a network. The second playback device 200-2 may be automatically turned on when the storage device 300 is inserted into the first playback device 200-1. Furthermore, the playback of content in the second playback device 200-2 may be possible through an external interface (e.g., the remote controller 900) or a user interface (e.g., a touch screen, a voice, or a gesture).

In a fifth example, the user 100 may play secure high definition content by inserting the storage device 300 in which the content has been stored into the playback device 200-3 and downloading the content from an external content server. In this case, the content may be stored in the storage device 300, and the external content server may be the content server of the content provider 400 or the retailer 500.

In order to play secure high definition content, a specific application may be required. The specific application described in this specification may mean a software program for playing secure high definition content. For example, the specific application may mean a software program capable of playing anticopying high definition content which has been stored or may be stored in an HDD, a portable hard drive, such as an SSD, a flash memory product, such as a USB flash drive or an SD card.

In particular, in the case of a playback device incapable of playing secure high definition content, the installation of the specific application may be essential in order to play the content.

FIG. 2 is an embodiment to which the present invention is applied and shows a schematic internal block diagram of a playback device for playing secure high definition content.

The playback device 200 may basically include a communication unit 210, a user interface 220, an external input/output terminal 230, an output unit 240, an encoder/decoder 250, memory 260, a certification unit 270, a power supply unit 280, and a controller 290. The communication unit 210 may include a reception unit 211 and a transmission unit 212, and the output unit 240 may include a display unit 241 and a speaker 242.

The communication unit 210 may include one or more modules which enable wired/wireless communication between the playback device 200 and a content server or between the playback device 200 and another electronic device connected to the playback device 200 over a network. For example, the reception unit 211 may receive a signal transmitted by the content server or another electronic device through a channel. In this case, the signal may include secure high definition content data. The transmission unit 212 may send information necessary to download or stream the secure high definition content data to the content server or another electronic device. For example, the information necessary to download or stream the secure high definition content data may include at least one of the identification information, transaction information, license information, level information, and device certificate information of the playback device and/or the storage device. In this case, the license information is indicative of information that permits the playback of purchased content. For example, the license information may include at least one of license file information and license key information.

The user interface 220 functions to transfer input information from a user to the playback device 200. For example, the user interface 220 may be used when the playback of the secure high definition content is controlled, information necessary for purchasing or an authentication procedure is inputted, or setting for playback in another electronic device is performed. The user interface 220 may include a touch screen unit (not shown), a voice recognition unit (not shown), or a gesture recognition unit (not shown), and may be a separate external device, such as a remote controller.

The external input/output terminal 230 functions as a passage to an external device connected to the playback device 200. The external input/output terminal 230 receives data from an external device or is supplied with power from an external device and transfers the power to each of the elements of the playback device 200 or enables data within the playback device 200 to be transmitted to an external device. For example, the external input/output terminal 230 may be indicative of a connection terminal for connection to the storage device 300. For a detailed example, the external input/output terminal 230 may include at least one of a USB port, an HDMI port, a wired/wireless headset port, an external charger port, a wired/wireless data port, a memory card port, an audio input/output (I/O) port, a video I/O port, and an earphone port. Communication between the storage device 300 and the playback device 200 may be performed through the external input/output terminal 230.

The output unit 240 functions to generate output related to the sense of sight and the sense of hearing, and may include the display unit 241 and the speaker 242.

The display unit 241 may output visual information processed by the playback device 200. For example, the display unit 241 may output secure high definition content, may output information indicating that the storage device 300 has been plugged in, or may output information required in a process of purchasing or certificating content. The display unit 241 may include at least one of a liquid crystal display, a thin film transistor liquid crystal display, an organic light-emitting diode, a flexible display, and a 3D display.

The speaker 242 may output auditory information processed by the playback device 200. For example, the speaker 242 may output audio information of content or may output information necessary for the playback of content in the form of voice information.

The encoder/decoder 250 may be used to decode the secure high definition content in order to display the secure high definition content or may be used to encode an image signal or audio signal received from the playback device 200.

The memory 260 may store a program for the operation of the controller 290 and may temporarily store inputted/output data. For example, the memory 260 may store a specific application for playing the secure high definition content and may store the identification information, profile information, level information, device certificate information, and metadata of the content of the playback device 200.

The memory 260 may include at least one type of a storage medium, including a flash memory type, a hard disk type, a multimedia card micro type, card type memory (e.g., SD or XD memory), random access memory (RAM), static random access memory (SRAM), read-only memory (ROM), electrically erasable programmable read-only memory (EEPROM), programmable read-only memory (PROM) magnetic memory, a magnetic disk, and an optical disk. Furthermore, the playback device 200 may operate in relation to a web storage which performs the storage function of the memory 260 on the Internet.

The certification unit 270 may decrypt encrypted content in order to play the content. In this case, the certification unit 270 may perform an acknowledgement process for key information and may send and receive the certificate information of the storage device or a playback device.

The power supply unit 280 is supplied with external power and/or internal power under the control of the controller 290 and supplies power necessary for the operation of each of the elements.

The controller 290 controls an overall operation of the playback device 200. For example, the controller 290 may control an operation of detecting the connection of the storage device 300, receiving device certificate information from the retrieved storage device, or sending the received device certificate information to a server.

Furthermore, the controller 290 may control an operation of receiving an encrypted media file and a certificate revision list (CRL) from the server, storing the encrypted media file in the storage device, or updating the CRL based on the device certificate information, or playing the encrypted media file based on the updated CRL.

Also, the controller 290 may search for content stored in a different storage device, and play the searched content through the output unit 240.

FIG. 4 is a view illustrating a network system structure of a storage device and a playback device according to license, to which the present invention is applied.

Here, a licensed playback device (or a licensed content player device) 200-1 may be a playback device such as a TV, an STB, or a mobile device licensed to satisfy complementation for playing premium content.

An unlicensed playback device (or an unlicensed content player device) 200-p refers to a playback device such as a TV, an STB, or a mobile device available to play general content.

A content download device 300-K refers to a device connected to a network and available to download various types of DRM or clear content, such as a PC, an STB, Kiosk, or Nas.

A licensed or unlicensed storage device refers to a storage device licensed or unlicensed to satisfy security for playing premium content.

Referring to FIG. 4, the licensed playback device 200-1 may receive a license key and/or a license file for playing content from a key & license server 800, and receive content transmitted from a download server 600.

However, the unlicensed playback device 200-p cannot receive the license key and/or the license file for playing content from the key & license server 800 but may receive content from the download server 600.

However, since the unlicensed playback device 200-p does not have the license key and/or the license file, it cannot use a high definition (HD) content playback service.

Encrypted content may be moved or copied among the unlicensed download device 300-K, the licensed playback device 200-1, and the unlicensed playback device 200-p.

In the licensed playback device 200-1 and the licensed storage device 1, data may be managed and kept through a secure area. Also, the licensed storage device 1 may be connected to the licensed playback device 200-1 by a safe session to provide an SCSA service.

In the network system structure, the licensed playback device 200-1 may play even content of a storage device connected to a different playback device, as well as content of a storage device directly connected thereto.

In this case, if the licensed playback device 200-1 directly searches for every storage device to play content, a load of the licensed playback device 200-1 may be increased and a content play time may be lengthened disadvantageously.

Thus, in order to solve the problem, each playback device may search for content of a storage device connected thereto and transmit the search result to the licensed playback device 200-1.

FIGS. 5 through 7 are views illustrating a system structure of a storage device and a playback device capable of storing and playing secure high definition content according to an embodiment to which the present invention is applied. Hereinafter, a playback device that intends to play content will be referred to as a master playback device.

Referring to FIG. 5, a master playback device 200-1 is connected to a storage device 1 300-1, a playback device 2 200-2, a playback device 3 200-3, and a playback device 4 200-4.

Also, the playback device 2 200-2 is connected to is connected to a storage device 200-2, a playback device 200-3 is connected to a storage device 3 300-3, and a playback device 4 200-4 is connected to a storage device 4 300-4 and a storage device 5 300-5.

Referring to FIG. 6, each of the storage devices may include the same content or different content.

When the master playback device 1 200-1 wants to output a file 1 through an output unit, the master playback device 200-1 may receive the file 1 from the storage device 300-1 or may output it though a real time streaming service.

Also, the master playback device 1 200-1 may receive the file 1 from the storage device 3 300-3, or the storage device 5 300-5 or may play the file 1 through streaming.

Here, in order for the playback device 1 200-1 to output content stored in a different storage device, not in a storage device directly connected thereto, the playback device 1 200-1 should recognize in which storage device the file 1 is stored.

However, searching for every storage device by the playback device 1 200-1 may be a big burden on the playback device 1 200-1 as described above with reference to FIG. 4, and cause large power consumption.

Thus, in order to solve the problem, if a playback device connected to each storage device knows content information included in the storage device connected thereto in advance, the burden on the master playback device 1 200-1 may be significantly reduced.

Referring to FIG. 7, while the master playback device 1 200-1 searches for a storage device connected to every playback device, a specific storage device may be not supposed to be searched.

In detail, in FIG. 7, the master playback device 1 200-1 may receive content information searched by each playback device. Here, however, in some cases, content included in the storage device 4 300-4 should not be searched by the master playback device 1 200-1 (for example, a secret document or a file including personal contents).

In this case, the playback device 4 200-4 may transmit content information excluding content information included in the storage device 4 300-4 to the master playback device 1 200-1.

In order to prevent the storage device 4 300-4 from being searched, a lock function may be set, and in a case in which the lock function is turned on (locked), the storage device 4 300-4 may be prevented from being searched by other playback devices excluding the currently connected playback device 4 200-4.

However, in a case in which the lock function is turned off, the other playback devices, as well as the currently connected playback device 4 200-4, may search for the storage device 4 300-4.

FIG. 8 is a flow chart illustrating a process of searching for content from a storage device connected to a playback device according to an embodiment to which the present invention is applied.

Referring to FIG. 8, content information included in a storage device connected to a different playback device, as well as a storage device to which a playback device is directly connected, may be received.

In detail, when the storage device 1 300-1 is plugged in (S810), the playback device may automatically search for the plugged-in storage device and check the storage device 1 300-1 according to the search result (S812).

In searching for the storage device, (i) a storage driver of the playback device may detect an ID of the storage device and compare the detected ID with a licensed storage ID list (file form such as table, xml, etc.) of the storage device 1 300-1 to determine whether the storage device is a licensed storage device.

The licensed storage ID list may include at least one value among a vendor ID (VID), a device ID (DID), a firmware version (FW), and a support protocol (PORT).

(ii) In a second method, the storage driver adds a field such as whether a SCSA is supported or a support protocol to a command response for identifying a device by interfaces, so that the playback device 1 200-1 may determine whether the storage device 1 300-1 is supported.

(iii) In a third method, after the storage device 1 300-1 is recognized and mounted in a file system, a specific file, or the like, is put in a specific folder, and whether the corresponding storage device 1 300-1 supports specific security and a corresponding protocol is determined on the basis of contents of the corresponding file.

The aforementioned three methods may be used individually or complexly.

Thereafter, after searching for the storage device 1 300-1, the playback device 200-1 may search for content included in the storage device 1 300-1 (S814).

In the content searching, (i) a file list of a format of content intended to be output may be searched from every file of the storage device 1 300-1.

(ii) In a second method, a specific directory structure may be designated and only an appropriate format of file list present in a corresponding position may be searched to search for content.

(iii) In a third method, a specific partition may be designated, and only when a flag is matched to a reserved area of a corresponding partition, a file list may be searched.

(iv) In a fourth method, the aforementioned methods may be complexly used, and here, an ID, a title, or a path of a searched file list may be stored as a play list database in a table format or a file format such as xml, or the like, and thereafter, when the storage device 1 300-1 is detected or when the corresponding file list is requested through a path of a different network, or the like, the file list may be used again without performing searching, thus performing content discovery (S814).

Thereafter, the storage device 300-1 and/or the playback device 1 200-1 may receive a playback right, a license key, or a license file from the server 800 through license providing (S816), and accordingly, the playback device 1 300-1 may output content from the storage device 1 300-1 (S818).

The playback device 2 200-2 may search for content from the storage device 2 300-2 in the same manner as that of the playback device 1 200-1 (S820 to S828).

In order for the playback device 1 200-1 to search for content included in the storage device 2 300-2, the playback device 1 200-1 may transmit a second storage device search request to the playback device 2 200-2 (S830).

The playback device 2 200-2 may transmit an ID list to the playback device 1 200-1 (S832). The ID list may include at least any one of a player ID (PID), a storage ID (SID), and a content ID (CID).

Thereafter, the playback device 1 200-1 may transmit a content search request to the playback device 2 200-2 (S834), and the playback device 2 200-2 may transmit a content ID list to the playback device 1 200-1 in response thereto (S836).

Steps S834 to S836 are not essential and may be omitted.

Through the method described above with reference to FIG. 8, the playback device 1 200-1 may receive content information included in the storage device 2 300-2 from the playback device 2 200-2, and also, through the method, the playback device 1 200-1 may effectively provide content to a user.

FIG. 9 is a flow chart illustrating a process of searching for and playing content from a storage device connected to a playback device according to an embodiment to which the present invention is applied.

In FIG. 9, steps S910 to S928 are the same as steps S810 to S828 of FIG. 8, so a description thereof will be omitted.

The playback device 1 200-1 and the playback device 2 200-2 may receive a license and a license key required for playing HD content from the license server 800 through license providing (S930), and the playback device 1 200-1 may output content of the storage device 2 300-2 through the playback device 2 200-2 (S932).

FIGS. 10A and 10B are views illustrating a method for connecting a session between a storage device and a playback device based on a license according to an embodiment to which the present invention is applied.

Referring to FIGS. 10A and 10B, the playback device 1 200-1 may receive the latest storage device list from the key & license server 800. Upon receiving the latest storage device list, the playback device 1 200-1 may update a storage device list file.

The playback device may determine whether a storage device connected thereto is a licensed storage device.

For example, in a case in which a VID, a DID, or a FW of the storage device 1 are 0x11, 0x22, and 0x01, respectively, when the ID is present in a storage device list file of the playback device 1 200-1, the storage device 1 300-1 may provide content to the playback device 1 200-1 through a safe session.

However, when the ID is not present in the storage device list file, the unlicensed storage device may output content through the playback device 1 200-1 through an unsafe session, rather than through a separate safe session.

FIG. 11 is a flow chart illustrating a process of updating a storage device list for content discovery according to an embodiment to which the present invention is applied.

Referring to FIG. 11, the playback device 1 200-1 may receive a storage device list updated by the license server 800, and thus, the playback device 1 200-1 may determine whether a new storage device has been updated.

In detail, steps S1110 to S1112 are the same as steps S812 to S814 of FIG. 8, so a description thereof will be omitted.

Thereafter, in order to determine whether a storage device list file of the playback device 1 200-1 is required to be updated, the playback device 1 200-1 may transmit a request for checking a storage list file version to the license server 800 (S1114).

When the storage list file version is not the latest file version according to the result of checking the storage device list file version (S1116), the playback device 1 200-1 may transmit a request for updating a storage device list file to the license server 800 (S1118).

After updating the storage device list file, the playback device 1 200-1 may request the storage device 1 300-1 to check the storage device list file version (S1120).

When the file version is not the latest version according to the check result (S1122), the playback device 1 200-1 may request the storage device 1 30-1 to update the list file (S1124).

When updating is terminated, the playback device 1 200-1 may check a protocol and an ID for content playing (S1126), and may start provisioning with the license server 800 and the storage device 1 300-1 to play content (S1128).

FIGS. 12 and 13 are flow charts illustrating a process of searching for a storage device using short-range communication according to an embodiment to which the present invention is applied.

Referring to FIGS. 12 and 13, a playback device may selectively search for only an interested device through short-range communication, or may search for every device and manage only an interested device separately. The short-range communication refers to every technology enabling short-range communication such as Wi-Fi, Bluetooth, or near-field communication (NFC). Hereinafter, universal plug and play (UPnP), short-range communication, will be described as an example.

In detail, in FIG. 12, in a case in which a SCSA NAS 1220 and a DMS 1210 are newly added to the UPnP network, the SCSA NAS 1220 may transmit an advertise message including device type information to an SCSA playback device 1230 through multicasting or broadcasting (S1210).

If the SCSA NAS 1220 includes content desired to be played by the SCSA playback device 1230 so it is an interested device, the SCSA playback device 1230 may register the SCSA NAS 1220 as an interested device (S1220).

The DMS 1210 may also transmit an advertise message including device type information to the SCSA playback device 1230 through multicasting or broadcasting (S1230).

However, the DMS 1210 does not include content desired to be played by the SCSA playback device 1230 so it is not an interested device, the SCSA playback device 1230 may not register the DMS as an interested device (S1240).

Referring to FIG. 13, the SCSA playback device 1230 may transmit a message including information regarding a device that the SCSA playback device 1230 searches for, by using broadcasting or multicasting in order to search for an interested device.

When the SCSA NAS 1220 includes content desired to be played by the SCSA playback device 1230, the SCSA NAS 1220 may transmit a response message including a URL to the SCSA playback device 1230 (S1320).

Upon receiving the response message, the SCSA playback device 1230 may register the SCSA NAS 1220 as an interested device (S1330).

In another embodiment of the present invention, in a case in which an SCSA storage device or a different SCSA playback device is a device required for the SCSA playback device 1230 to play content, the SCSA playback device 1230 may store the SCSA storage device or the different SCSA playback device as an interested device.

In another embodiment, in order to search for every device, the SCSA playback device 1230 may transmit a search message to every device through broadcasting or multicasting, and in a case in which the SCSA storage device and the different SCSA playback device are interested devices of the SCSA playback device 1230, the SCSA storage device and/or the different SCSA playback device may transmit a message including a URI to the SCSA playback device 1230.

Upon receiving the message including the URI, the SCSA playback device 1230 may register the SCSA storage device and the SCSA playback device as interested devices.

FIGS. 14A through 14C are views illustrating a session connection scheme based on a license according to an embodiment to which the present invention is applied.

Referring to FIGS. 14A through 14C, it is illustrated that, in data transmission between licensed playback devices, when a playback device and a storage device are disconnected, a new session is established.

In detail, the licensed playback device 1 200-1 and the licensed playback device 2 200-2 in FIG. 14A transmit protected data to each other.

Here, in FIG. 14B, when the safe session connection between the licensed playback device 2 200-2 and the licensed storage device is terminated, the licensed playback device 1 200-1 may establish a new safe session with the storage device of the licensed playback device 2 200-2 and transmit and receive data in order to discover content stored in the licensed storage device 2.

In FIG. 14C, in a case in which the safe session connection between the licensed playback device 2 200-2 and the licensed storage device 2 is terminated and the safe session connection between the licensed playback device 1 200-1 and the licensed storage device 1 is terminated, the licensed playback device 1 200-1 may establish a new safe session with the storage device of the licensed playback device 2 200-2 to transmit and receive data in order to discover content stored in the licensed storage device 2.

FIG. 15 is a view illustrating an example of a data directory structure for managing HD content according to an embodiment to which the present invention is applied.

The data directory structure for managing HD content may be divided into a root directory, a system directory and HD content image directory, and content type.

A directory according to each content may be subdivided according to a content title, and each content title includes a zip file unit for copying, shifting, and downloading a license file, or the like.

The directory structure is an example, and various other directory structures may exist.

Even though contents or a position of each content are changed due to copying, shifting, or downloading, a playback device should recognize such a change and list up content.

In this process, when content is frequently changed, a rate may be lowered and changed content may not be discovered. Hereinafter, a method for solving such a problem will be described with reference to FIG. 16.

FIG. 16 is a view illustrating meta data provided according to content according to an embodiment to which the present invention is applied.

In this embodiment, when a storage device is plugged in to the playback device 1 and the playback device 1 plays HD content stored in the storage device or when HD content stored in a storage device which is plugged in to the playback device 2 is intended to be played by the playback device 1, meta data illustrated in 16 may be provided to the playback device 1.

Referring to FIG. 16, meta data provided to the playback device 1 200-1 may include mandatory information 1620 and optional information 1630.

The mandatory information 1620 may include a content ID 1621, a title 1622, a class 1623, a parent ID 1624, or path information indicating a path to a directory in which the content is included, which are essential information in providing content.

The optional information 1630 may include a producer 1631, Res 1632, an artist 1633, a genre (1634), an actor 1635, an album 1636, a date 1637, and a size 1638.

Since the meta data is generated and provided to the playback device 1 200-1, even though content is copied, moved, or downloaded, the playback device 1 200-1 may obtain information of content without having to search for the entire playback devices.

FIG. 17 is a view illustrating a message configuration for content discovery according to an embodiment to which the present invention is applied.

Referring to FIG. 17, a message including class information 1700 and date information 1710 may be transmitted from a storage device 300 to a playback device 200.

In order to search for content included in the storage device 300 on the basis of the meta data illustrated in FIG. 16, a message transmitted from the playback device 200 may include an item ID and a parent ID 1720 and 1760, title information of content 1730 and 1770, information related to date of content 1740 and 1780, and information related to content class 1750 and 1790.

By transmitting the convent discovery message including such information to the storage device 300, the playback device 200 may effectively discover content.

FIG. 18 is a view illustrating a rating table for playing content according to an embodiment to which the present invention is applied.

As for secure HD content, appropriate content is provided according to a user rating or right. For example, when a user grade is low or a user has small rights, partial content may not be provided, and when a user grade is high or a user has large rights, content may be provided without a limitation. Such grade/rights is called rating.

The rating should be set manually by a user, and thus, if a rating value is erroneously set, content of grade/rights not appropriate for the user may be provided. FIG. 18 illustrates a rating table applied to the present invention. The rating table 1810 may include an entry count 1820, a rating region 1830, a rating code 1840, and a rating value 1850.

The entry count 1820 may indicate an entire rating value included in the rating table 1810 and have a size of 2 bytes.

The rating region 1830 may indicate a region in which the content is provided. For example, in a case in which a region in which the content is provided is the Republic of Korea, the rating region 1830 may have a value indicating the Republic of Korea and have a size of 2 bytes.

The rating code 1840 may indicate a value of a rating code mapped to a rating value and have a size of 2 bytes.

The rating value 1850 may have a rating value based on age and have a size of 1 byte. The rating value may include values as illustrated in Table 1 below.

TABLE 1

| Rating_value | Description |
| --- | --- |
| 0x00 to 0x1F | Minimum age |
| 0x20 to 0xFF | Reserved |

The rating table 1810 is stored in a license file and updated with the latest rating table when license provisioning for receiving a license key, a license file, and/or rights is performed.

Values and functions for indicating a version of the rating table 1810 are defined as follows.

RatingTableVersion: It is a value for indicating a version of a rating table, has 2 bytes, and has major and minor forms. It may have values of major version (1 byte) and minor version (1 byte).

GetRatingTableVersion(license_key): It is a value for requesting the rating table version value from the license server 800. Each content may be distinguished by using a license key.

GetLicenseFile(License-key): It is a value used for requesting a license file from the license server when the rating table is changed.

FIG. 19 is a flow chart illustrating a process of playing content according to a rating level according to an embodiment to which the present invention is applied.

Referring to FIG. 19, a playback device 200 may receive a license file from a server 800 and provide content based on a rating level to a user.

In detail, the playback device 200 may configure a rating table on the basis of a reference rating table and store the configured rating table (S1900).

A rating level is set by a user of the playback device 200 (S1902). Steps S1900 and S1902 may be performed in a preprocessing stage.

Thereafter, the playback device 200 may establish connection with the license server 800 through initial set-up (S1904).

Upon establishing the connection with the license server 800 through the initial set-up, the playback device 200 selects content to be played and parse meta data of the selected content (S1906).

Parsing refers to conversion of data stored in a different format into data in a desired format, and may be used when storage structures are similar. In the present invention, a rating value of "xml" box is parsed.

Upon obtaining the meta data value through parsing, the playback device 200 transmits "GetRatingTableVersion" for requesting version information to the server 800 in order to check whether a rating table has been changed (S1908).

Upon receiving the request for version information, the server 800 transmits version information of a current rating table to the playback device 200 (S1910).

Upon receiving the version information of the rating table from the server 800, the playback device 200 determines whether the rating table has been changed (S1912), and when the rating table has not been changed, the playback device 200 may start to play selected content (S1924).

However, when the rating table has been changed, the playback device 200 may transmit a message including "GetLicenseFile" to the server 800 in order to request a license file including the changed rating table (S1914).

The server 800 may transmit a license file to the playback device 200 in response to the message including "GetLicenseFile".

A header of the license file may have a structure as illustrated in Table 2 below.

TABLE 2

| | |
| --- | --- |
| File type identifier (constant) [8 byte] 0x534353412D4C494c("SCSA-LIC") | Reserved(ignore) [8 byte] |
| License file hash (of all fields after the title certificates) [32 byte] | |
| Total License file size [8 byte] | LicenseID_Mfr and LicenseID Brand [8 byte] |
| License file ID [8 byte] | License File issue date and time [8 byte] |
| Reserved (ignore) [48 byte] | |
| Four URLs for locating license servers [512 byte] | |
| Encrypted Time-release keys [48 byte] | Release key check value [16 byte] |
| Exact release date and time [8 byte] | Reserved(ignore) [56 byte] |
| Rating_table [256 byte] | |

A size of the header of the license file is 1024 bytes. In the license file header, a rating table is defined as illustrated in Table 3 below.

TABLE 3

| Size | Value | Example |
| --- | --- | --- |
| 2 Bytes | RatingTableVersion | Version of Rating Table is indicated (Major version, Minor version) |
| 2 Bytes | entry_count | Number of entire ratings included in Rating table |
| Remaining 252 Bytes | Rating information | It includes rating_region, rating-code, and rating value by Entry Count |

Upon receiving the license file, the playback device 200 updates a reference rating table on the basis of the rating table included in the license file (S1918).

Upon updating the rating table, the playback device 200 compares a rating value of selected content with a rating level set in the playback device 200 to determine whether the content can be played (S1920).

If the rating level set in the playback device 200 does not have the playback right the selected content, the playback device 200 stops playing (S1922).

If, however, the rating level set in the playback device 200 has the playback right the selected content, the playback device 200 may play the selected content (S1924).

In the method for providing the secure HD content service through the method of FIG. 19, in order to apply an appropriate rating to each user, each user information should be registered, and whenever users are changed, the rating configuration should be directly changed.

As for the change in the rating configuration, when users are frequently changed, it is cumbersome to set the rating, and if the rating is not changed, a previously set rating level may be used as is, making it difficult to play appropriate content for each user.

Thus, in order to solve the problem, a method of automatic rating configuration by interworking with a user device is proposed.

FIG. 20 is a flow chart illustrating a process for flexibly changing a rating level according to a user according to an embodiment to which the present invention is applied.

In the flexible rating configuration method, a mobile device (for example, a smartphone) is registered in a playback device using wireless communication such as Bluetooth, Wi-Fi, or long term evolution (LTE), and when the mobile device is detected near the playback device, a rating configuration may be automatically changed to a corresponding user.

In detail, the playback device 200 registers a user device through Bluetooth, Wi-Fi, or LTE, and maps user information for rating control thereto and stores the same (S2010).

Thereafter, when content to be played is selected (S2020), the playback device 200 may search for an adjacent user device (S2030).

After the adjacent device is searched, the playback device 200 determines whether the searched device is a registered device (S2040).

When the searched device is not a registered device, only a minimum playback right may be set (S2050) and the content may be played according to the set playback right (S2070).

Meanwhile, when the searched device is a registered device, a playback right according to the rating table is set on the basis of registered user information (S2060) and the content is played according to the set playback right (S2070).

Through the method illustrated in FIG. 20, by registering a user device using the playback device at an initial stage, a user device may be automatically searched to set a rating level, without a separate rating table setting, and content may be played according to the set rating level. Accordingly, cumbersomeness of setting a rating for each user each time may be reduced and content may be effectively provided according to a user.

FIG. 21 is a view illustrating that a rating level is set to be different according to a frame of content according to an embodiment to which the present invention is applied.

As for existing rating control, entire content is designated by one rating level, and thus, several versions according to a rating level need to be present for the same content. Thus, in order to store the various versions of the same content, storage capacity is increased. Hereinafter, in order to solve the problem, a method of separately setting a rating level for each content frame and separately playing each content frame according to a rating level of each content frame will be described.

Referring to FIG. 21, rating level information is separately indicated in each frame of content. Among the frames, the lowest rating level is applied to a general frame that may be viewed by every user, and an appropriate rating level is applied to a violent or lascivious scenes.

For example, a low rating level C is set for a frame 1 2110, a frame 2 2120, and a frame 5 2150 so that any one may view the frames, and a rating level higher than the rating level C is set for a frame 3 2130 and a frame 4 2140 so that only a specific user may view the frames.

In particular, a frame level A of the highest rating is set for the frame 4 2140 so that a user who does not have the highest rights or who does not have the highest user level cannot play the frame.

In such a case, a user having the rating level C cannot play the frame 3 2130 and the frame 4 2140 having a rating level higher than C.

The illustrated frame levels are an example, and various other frame level setting methods may exist.

By setting rating level information for each frame, various versions are not required for the same content and a played frame may be controlled by one content according to several rating levels.

FIG. 22 is a flow chart illustrating a process of setting a separate rating level according to a frame of content and playing content according to an embodiment to which the present invention is applied.

In an embodiment of the present invention, a playback device 200 may check a rating level of a user and, when the user has a playback right the corresponding frame, the playback device 200 may perform decryption to play the frame, whereas when the user does not have the playback right, the playback device 200 does not perform decryption such that the corresponding frame may not be played.

In detail, when the user plays content, the playback device 200 checks a rating level of the current user (S2210) and checks rating level information of each frame of content (S2220).

Upon checking the rating level information of each frame, the playback device 200 compares a rating level of the frame intended to be played with a rating level of the user to determine whether the frame intended to be played is a frame that can be played (S2230).

When the user does not have a playback right according to the determination result, that is, when the rating level of the user is lower than a rating level of the frame intended to be played, the playback device 200 does not decrypt the corresponding frame, whereas when the user has a playback right, that is, when the rating level of the user is the same as or higher than the rating level of the frame intended to be played, the playback device 200 may decrypt the corresponding frame (S2240) to play it. Here, when a frame is not decrypted, the frame cannot be played, and only a decrypted frame may be normally played.

In a case in which the frame cannot be played due to lack of the playback right it, a guide phrase, for example, "scene is not allowed to access" may be displayed so that a screen of a previous frame is stopped and the frame not allowed to access due to lack of the playback right may not be played, or the frame not allowed to access due to lack of the playback right may not be decrypted, and thus, the screen is broken and a sound may not be reproduced.

Also, the frame not allowed to access due to lack of the playback right may not be played without any notification and a next frame available to play may be played.

By repeatedly performing the process described above with reference to FIG. 22, a service regarding various rating levels may be provided only with one content, without having to store the same content in various versions, and storage capacity due to the content in various versions may be reduced.

FIG. 23 is a view illustrating a message for applying a separate rating level according to a frame of content according to an embodiment to which the present invention is applied.

Rating information of each frame may be included by extending "trik" box of a CFF (CommonFileFormat) container format.

In detail, when a flag value is 0 in a CFF container format 2310 of FIG. 23, an existing scheme of setting a rating level for each content is used, and when the flag value is 1, the scheme of setting rating level information for each frame described above with reference to FIGS. 21 and 22 may be used.

Here, for backward compatibility with the existing scheme, a different scheme may be used according to the flag value.

The embodiments described above may be variously modified and changed by those skilled in the art to which the present invention pertains without departing from the scope of the technical concept of the present invention, and thus are not limited to the aforementioned embodiments and accompanying drawings.

INDUSTRIAL APPLICABILITY

While exemplary embodiments have been shown and described above, it will be apparent to those skilled in the art that modifications and variations could be made without departing from the scope of the present invention as defined by the appended claims.

The invention claimed is:

1. A method for playing content stored in a storage device connected through at least one interface by a first playback device, the method comprising:
   requesting a second playback device to detect at least one storage device;
   receiving identification information indicating the at least one storage device;
   transmitting a request message requesting content information stored in the at least one storage device to the second playback device based on the identification information;
   receiving the content information from the second playback device;
   transmitting transaction information stored in the at least one storage device to a license server;
   receiving license information for permitting reproduction of content stored in the at least one storage device from the license server; and
   playing the content based on the license information,
   wherein the at least one storage device is connected to the second playback device,
   wherein the first playback device detects content stored in the at least one storage device and the at least one storage device via the second playback device,
   wherein the transaction information includes transaction identification information identifying a corresponding transaction and a user,
   wherein the license information includes a license file and a license key,
   wherein each frame of the content includes rating information related to playback of the each frame and is set with a first rating level indicating a reproducible rating,
   wherein the rating information includes a flag indicating whether the first rating level is applied to each frame, and
   wherein the identification information includes at least one of an identifier (ID) of the second playback device, an ID of the at least one storage device, or a content ID list.

2. The method of claim 1, further comprising:
   requesting the license server for storage device list version information;
   receiving the storage device list version information from the license server; and
   updating a storage device list based on the received storage device list version information,
   wherein the storage device list is a list of storage devices connected to a playback device, and
   wherein the playback device is connected to the first playback device.

3. The method of claim 1, further comprising:
   receiving meta data regarding the content from the second playback device.

4. The method of claim 1,
   wherein the at least one storage device includes a lock function, and
   wherein when the lock function is set, the identification information does not include an ID indicating a storage device for which the lock function is set among the at least one storage device.

5. The method of claim 1, wherein the step of playing the content further comprises:
   searching a device of surroundings;
   setting a second rating level indicating a reproducible rating of the content; and
   playing the content based on the second rating level according to the flag.

6. The method of claim 5,
   wherein when the searched device is a registered user device, the second rating level is set based on information of the registered user device, and
   wherein when the searched device is not the registered user device, the second rating level is set to a lowest level.

7. The method of claim 5, wherein when the second rating level is higher than the first rating level, the content is played.

8. A device, as a first playback device, for playing content stored in a storage device connected through at least one interface, the first playback device comprising:
   a display unit configured to output played content;
   a communication unit configured to transmit and receive a signal; and
   a controller functionally connected to the communication unit,
   wherein the controller is configured to:
      request a second playback device to detect at least one storage device,
      receive identification information indicating the at least one storage device,
      transmit a request message requesting content information stored in the at least one storage device to the second playback device based on the identification information,
      receive the content information from the second playback device,
      transmit transaction information stored in the at least one storage device to a license server,
      receive license information for permitting reproduction of content stored in the at least one storage device from the license server, and
      play the content based on the license information,
   wherein the at least one storage device is connected to the second playback device,
   wherein the first playback device detects content stored in the at least one storage device and the at least one storage device via the second playback device,
   wherein the transaction information includes transaction identification information identifying a corresponding transaction and a user,
   wherein the license information includes a license file and a license key,
   wherein each frame of the content includes rating information related to playback of the each frame and is set with a first rating level indicating a reproducible rating, wherein the rating information includes a flag indicating whether the first rating level is applied to each frame, and wherein the identification information includes at least one of an identifier (ID) of the second playback device, an ID of the at least one storage device, and a content ID list.

9. The device of claim 8, wherein the controller is further configured to:
   request the license server for storage device list version information,
   receive the storage device list version information from the license server, and
   update a storage device list based on the received storage device list version information,
   wherein the storage device list is a list of storage devices connected to a playback device, and
   wherein the playback device is connected to the first playback device.

10. The device of claim 8, wherein the controller is further configured to:
    receive meta data regarding the content from the second playback device.

11. The device of claim 8,
    wherein the at least one storage device includes a lock function, and
    wherein when the lock function is set in the second storage device, the identification information does not include an ID indicating a storage device for which the lock function is set among the at least one storage device.

12. The device of claim 8, wherein the controller is further configured to:
    search a device of surroundings,
    set a second rating level indicating a reproducible rating of the content, and
    play the content based on the second rating level according to the flag.

13. The device of claim 12, wherein
    wherein when the searched device is a registered user device, the second rating level is set based on information of the registered user device, and
    wherein when the searched device is not the registered user device, the second rating level is set to a lowest level.

14. The device of claim 12, wherein when the second rating level is higher than the first rating level, the control unit plays the content.

* * * * *